(12) United States Patent
Matthews

(10) Patent No.: US 7,284,208 B2
(45) Date of Patent: *Oct. 16, 2007

(54) SYSTEM AND METHOD FOR ENABLING AT LEAST ONE INDEPENDENT DATA NAVIGATION AND INTERACTION ACTIVITY WITHIN A DOCUMENT

(76) Inventor: Scott Matthews, 225 W. 106 St., #14J, New York, NY (US) 10025

( * ) Notice: Subject to any disclaimer, the term of this patent is extended or adjusted under 35 U.S.C. 154(b) by 0 days.

This patent is subject to a terminal disclaimer.

(21) Appl. No.: 11/680,643

(22) Filed: Mar. 1, 2007

(65) Prior Publication Data
US 2007/0136696 A1    Jun. 14, 2007

Related U.S. Application Data

(63) Continuation of application No. 11/415,807, filed on May 1, 2006.

(60) Provisional application No. 60/676,444, filed on Apr. 29, 2005.

(51) Int. Cl.
G06F 3/00 (2006.01)
G06F 15/00 (2006.01)

(52) U.S. Cl. ............... 715/854; 715/738; 715/760; 715/851; 715/513; 715/515

(58) Field of Classification Search ............. 715/854, 715/760, 851, 738, 501.1, 513, 515
See application file for complete search history.

(56) References Cited

U.S. PATENT DOCUMENTS 5,734,380 A * 3/1998 Adams et al. ............ 715/804
5,745,910 A * 4/1998 Piersol et al. ............ 715/515

(Continued)

OTHER PUBLICATIONS

Nadeem et al ("A Study of Three Browser History Mechanisms for Web Navigation," IEEE Information Visualisation, 2001. Proceedings. Fifth International Conference on Jul. 25-27, 2001 pp. 13-21.*

(Continued)

*Primary Examiner*—Sy D. Luu
(74) *Attorney, Agent, or Firm*—Edward Etkin, Esq.

(57) ABSTRACT

The inventive system and method are directed to novel embodiments of various tools and infrastructures that enable a user of a document viewed on a data processing system using a document handling application, to engage in at least one additional concurrent data navigation/interaction activity in the document, and/or in the application handling the document, without affecting the user's document interaction activities. In the preferred embodiment of the invention the inventive system and method are implemented by enabling the handling application to present the document along with at least one Independent Data Interaction/Navigation Element (IDINE), that includes a display component for displaying and optionally enabling interaction with any data (content) provided thereto, and a control component for navigating the provided content. Advantageously, the novel system and method ensure that utilizing any particular IDINE to navigate content provided thereto, does not affect the user's ability to navigate or interact with content in the document, or in other IDINEs (if any are present). The system and method of the present invention also provide a number of novel techniques for implementing and modifying IDINEs, and also provide multiple advantageous IDINE-related infrastructures, having additional benefits to parties involved in IDINE use, implementation, and content provision thereto.

20 Claims, 15 Drawing Sheets

U.S. PATENT DOCUMENTS

| | | | |
|---|---|---|---|
| 5,933,140 A * | 8/1999 | Strahorn et al. | 715/712 |
| 6,031,989 A | 2/2000 | Cordell | |
| 6,243,091 B1 * | 6/2001 | Berstis | 715/839 |
| 6,259,445 B1 * | 7/2001 | Hennum et al. | 715/709 |
| 6,434,563 B1 | 8/2002 | Pasquali et al. | |
| 6,667,751 B1 * | 12/2003 | Wynn et al. | 715/833 |
| 6,683,629 B1 | 1/2004 | Friskel et al. | |
| 7,058,944 B1 * | 6/2006 | Sponheim et al. | 718/100 |
| 2004/0003351 A1 * | 1/2004 | Sommerer et al. | 715/517 |
| 2005/0050301 A1 * | 3/2005 | Whittle et al. | 712/32 |
| 2005/0060664 A1 * | 3/2005 | Rogers | 715/810 |
| 2005/0289478 A1 * | 12/2005 | Landman et al. | 715/804 |
| 2006/0036969 A1 * | 2/2006 | Guido et al. | 715/804 |

OTHER PUBLICATIONS

Weinreich et al ("Off the Beaten Tracks: Exploring Three Aspects of Web Navigation;" ACM Press, Proceedings of the 15th international conference on World Wide Web WWW '06; May 2006.*

Tabard et al ("Navigation: PageLinker: integrating contextual bookmarks within a browser;" ACM Press; Proceedings of the SIGCHI conference on Human factors in computing systems CHI '07.*

Publication: Chapter 16—Frames of "HTML 4.01 Specification—W3C Recommendation Dec. 24, 1999", Published by WC3, Date: Dec. 24, 1999; Location: http://www.w3.org/TR/html401/present/frames.html.

* cited by examiner

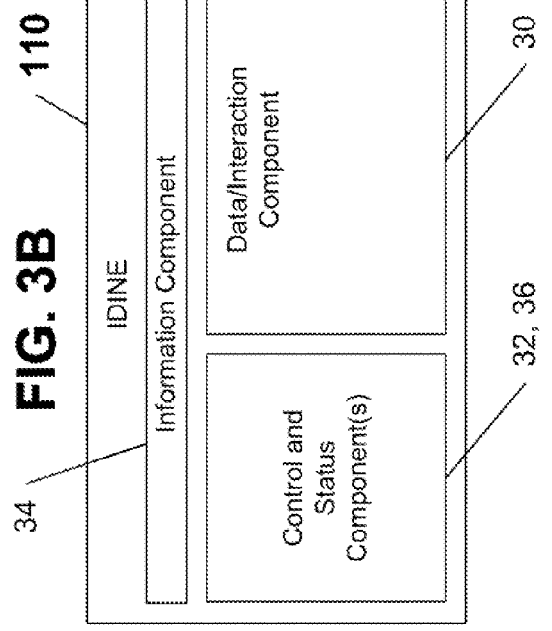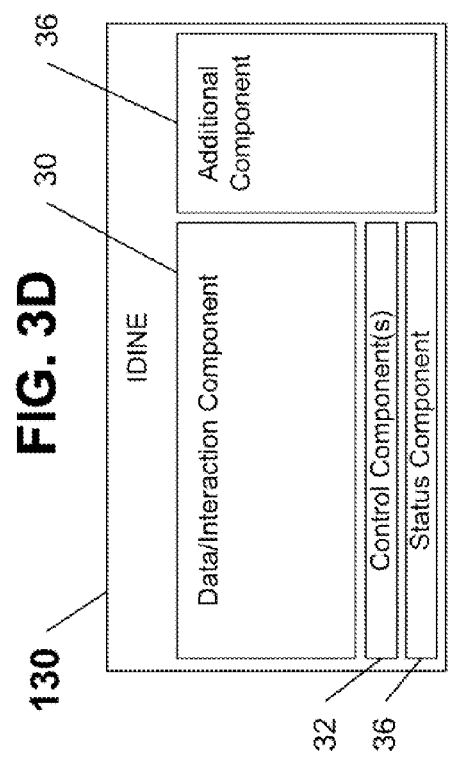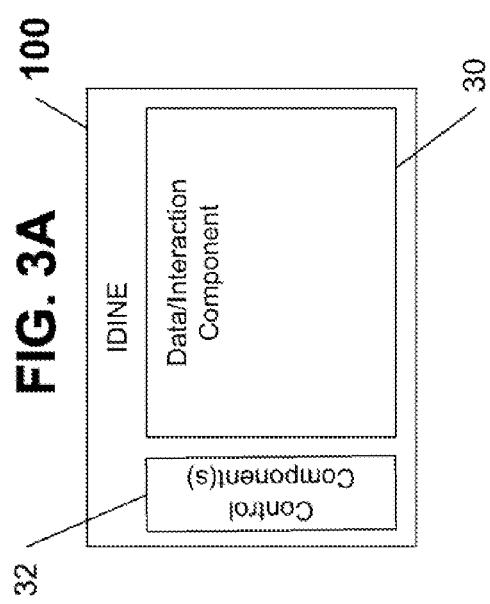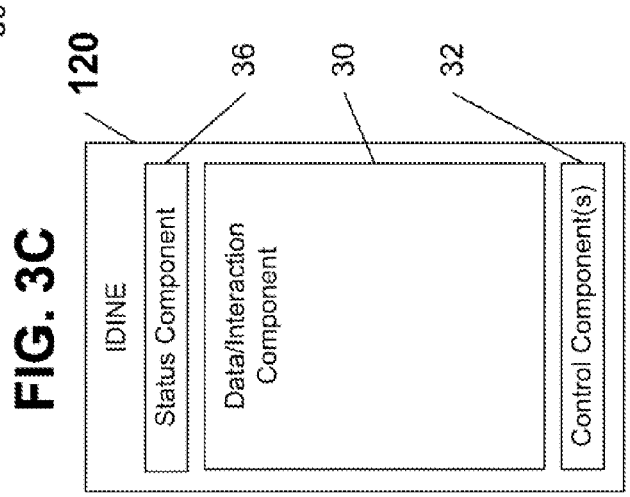

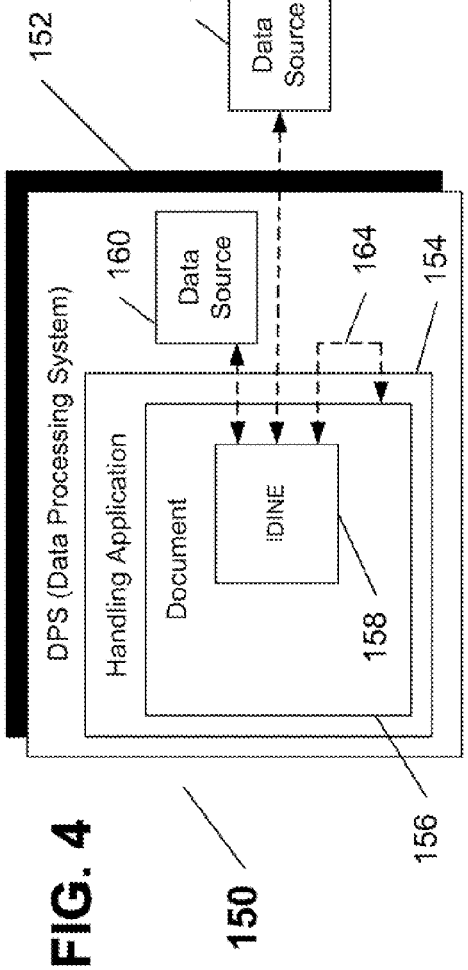
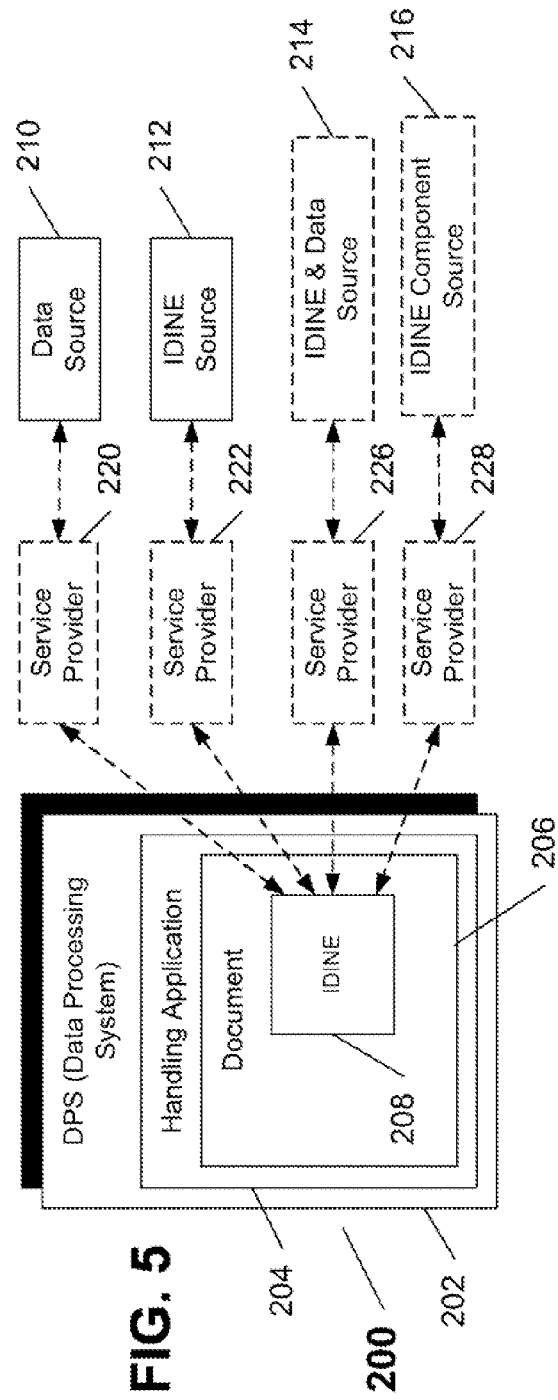

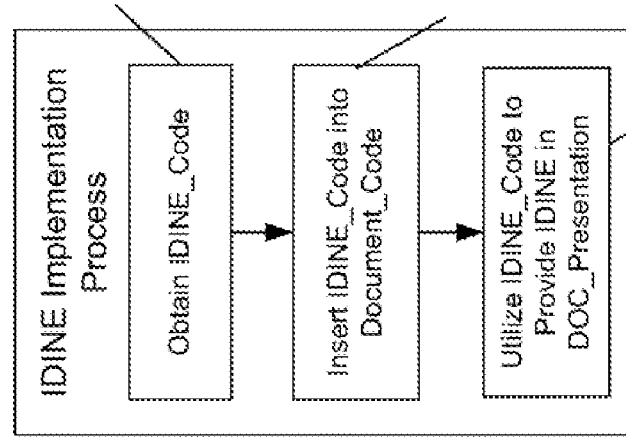

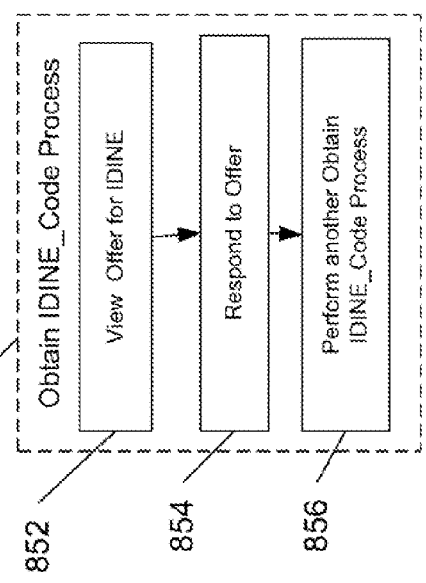
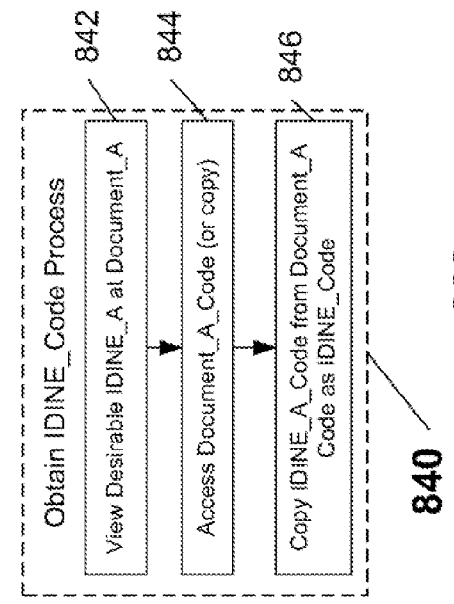
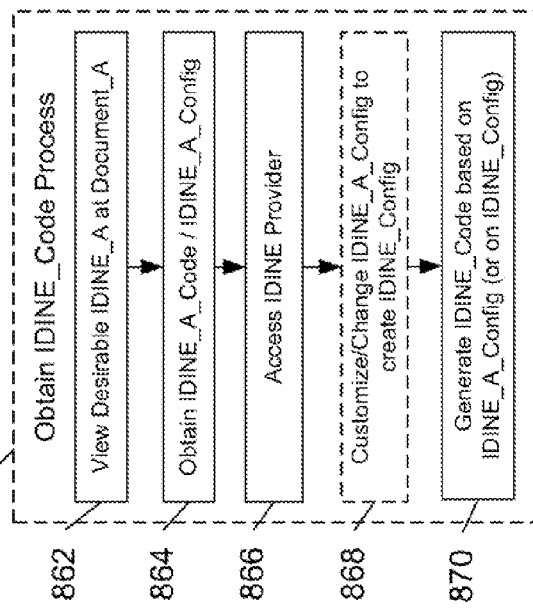

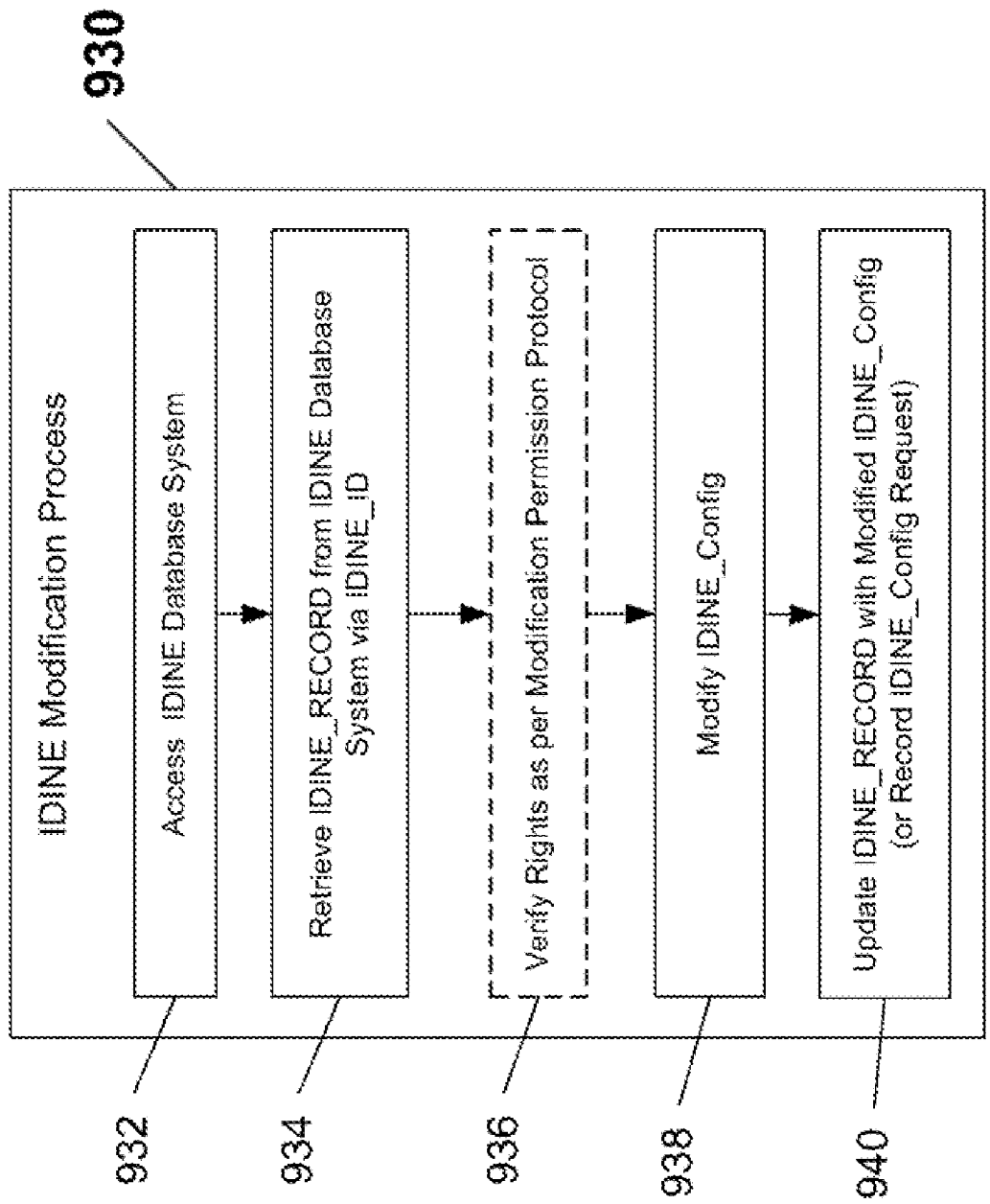

SYSTEM AND METHOD FOR ENABLING AT LEAST ONE INDEPENDENT DATA NAVIGATION AND INTERACTION ACTIVITY WITHIN A DOCUMENT

CROSS REFERENCE TO RELATED APPLICATION

The present patent application is a continuation of the commonly assigned U.S. patent application Ser. No. 11/415,807, entitled "System and Method for Enabling at Least One Independent Data Navigation and Interaction Activity Within a Document", filed May 1, 2006, which in turn claims priority from the commonly assigned U.S. Provisional Patent Application 60/676,444, entitled "Microbrowser" filed Apr. 29, 2005.

FIELD OF THE INVENTION

The present invention relates generally to a system and method for enabling at least one additional data navigation and interaction activity in a document, and more particularly to a system and method for enabling a user of a document to engage in at least one additional concurrent data navigation/interaction activity in the document, and/or in the application handling the document, without affecting the user's document interaction activity.

BACKGROUND OF THE INVENTION

In the last decade, the rapidly decreasing cost of computers, coupled with simultaneous performance gains, as well as the growing availability of inexpensive access to high speed telecommunications, have resulted in a dramatic jump in the installed base of computers and broadband telecommunication connections both in consumer and commercial areas.

In addition to demand for application programs that enable computers to perform a dizzying array of tasks, the proliferation of computers and low-cost high-speed telecommunications, also created an ever-growing demand for "content"—information that can be viewed and interacted with using computers equipped with appropriate application programs, and that can be sent and received from other computers through a telecommunication connection.

Not surprisingly, this course of events has led to constantly increasing availability of enormous amounts of information in a vast range of topics. With computer users being faced with an overwhelming selection of content, the challenges of facilitating access to, and interaction with content, have grown in importance.

Typically, content is presented to users in form of documents—virtual structures used by computers to enable content to be created, viewed, organized, edited, formatted, stored, deleted and otherwise interacted with, A document may include a single type of data (e.g., a text file, or an image), or it may include a wide variety of data types, and may itself include multiple documents and defined relationships therebetween (e.g., an elaborate Internet website with content feeds and other features, an interactive multimedia presentation, or a complex spreadsheet with macros), Thus, for example, a document can contain a single individual data item, such as a bitmap image, or one or more dynamic content feeds and/or to an interactive directory of other documents, and so on.

A document may be static—changeable only by editing it (e.g., a word processing document stored on a user's local computer, or it may be dynamic—changing on a continual basis, (e.g., incorporating constantly updated new content, for example, if the document is a website, through use of content feeds (XML, Podcasts, RSS, etc.)). Furthermore, while relatively recently there was a significant distinction between the ability to interact with content located on a user's computer system (or computer network), and with content available remotely (for example over the Internet), currently, and in the foreseeable future, this distinction continues to decrease, In fact, popular computer operating systems such as Windows®, and application programs designed for these systems, have been moving in the direction of eliminating the distinction entirely.

One of the key solutions to improving the ability of computer users to interact with content, whether local or remote, has been development of powerful application programs for handling complex documents having a variety of possible dynamic and/or static content. The most common form of these applications are used in conjunction with accessing the Internet, and are called "browsers" or "web browsers". Of course, as was noted above, even traditional local computer applications, such as word processing applications, have recently received the capabilities of handling complex documents by incorporating certain browser functionality.

Because complex documents are typically a collection of linked smaller documents, interaction with such document typically includes navigating between various portions of the document, for example, by activating links to other portions of the document (e.g., by selecting highlighted "hyperlinks"). Navigation is an activity that can quickly move the user to different portions of the document and in many cases to other remote documents entirely (for example if the user activates a link to another website). Accordingly, the ability to control the navigation (for example by using the "back" and "forward" buttons on the document handling application), is essential to a proper interaction experience, One particular challenge for content navigation, is that even using a handling application with proper navigational capabilities, it is easy to lose track of one's location in the overall document structure, or to find oneself viewing a document far removed from the document where the user started the navigation process. Additionally, because many types of documents (especially websites) depend on visitor presence and participation for ad revenue, there is a very significant goal of attracting visitors by offering interesting content (which typically involves making the document more complex and using many off-website links), but at the same time encouraging the user not to leave the website to pursue the presented content.

To address the above challenge, many users typically utilize multiple instances of the handling application so that they can interact with different content in each application. However, this approach is very problematic because running multiple instances of complex applications creates a significant load on the computer and its operating system causing a drop in performance. In addition, unless the user is lucky enough to have a very large display screen (or multiple displays), it is only possible to view a small amount of handling applications (no more than two or three) at the same time, and even then, at the expense of drastically reduced document viewing area. As a result, most users typically use one handling application while others remain in the background, and switch between applications as necessary. In addition, this attempted solution does not address a situation where the website is designed to present multiple concurrent documents.

One attempt at solving the above problem involves the use of a "tabbed" handling application where activating each tab reveals a separate document in a single instance of a handling application, such that the user can readily switch between multiple documents without worrying about arranging multiple instances of the application on their display. However, this approach fails to address the crux of the challenge, because it does not able to the user to concurrently engage in different content navigation/interaction activities—the user can still only use one document at a time, Another proposed solution for the above challenge was to focus on providing the handling application with additional modules (also called "plug-ins", "applets", "controls", "widgets", etc.), that enable certain types of predefined content to be displayed proximal to, but independently from, the document. For example, the handling application may be provided with a "sidebar" showing the local weather, displaying links to recent news stories, and providing a content feed. While this approach achieved some success, it is restricted to use with specific content determined by the module, and thus does not allow the possibility of concurrent independent navigation with content not covered by the module. More importantly, while the user has some limited interaction with content provided through the module, none of the previously known modules allow the user to navigate (i.e., to move back and forward) through the content as part of the interaction. Furthermore, due to the wide variety and easy availability of modules there is a real risk in utilizing too many modules or a poorly designed module that may damage the handling application.

A different challenge related to content interaction activities is the question of how content is organized and presented in a document, especially if the document includes content of different types or formats, and/or from different sources. One proposed and popular solution, applicable to website documents, involved the introduction of document structure techniques called FRAMESETs and later, more advanced techniques called iFRAMEs. The FRAMESET techniques allowed a document to be easily split into multiple regions or "frames", with various content being placed in each frame, essentially allowing multiple documents to be simultaneously displayed. iFRAMES provided an improvement to this functionality by essentially allowing a document to include one or more easily definable frames in any desired location, with each frame capable of displaying content. While these solutions partially addressed the above challenges, they both have a key flaw that prevent them from fully addressing the challenge—while a user can interact with content in a frame, for example by following a link to another document placed therein, the user is forced to use the navigation control of the handling application which may be extremely confusing and counter-intuitive.

Thus, none of the previously known content interaction approaches enable a user of a document to navigate content in a certain portion of the document without utilizing the navigation controls of the handling application.

It would thus be desirable to provide a system and method for enabling users of a document to engage in at least one additional concurrent content navigation/interaction activity in the document, and/or in the application handling the document, without affecting the user's document interaction activity It would also be desirable to provide a system and method for implementing the above independent content navigation capabilities in a rapid and convenient manner. It would additionally be desirable to provide a system and method for implementing the above independent additional content navigation capabilities within any document, without requiring any modification to the handling application. It would further be desirable to provide a system and method for enabling rapid and convenient modification of previously obtained independent content navigation capabilities.

BRIEF DESCRIPTION OF THE DRAWINGS

In the drawings wherein like reference characters denote corresponding or similar elements throughout the various figures:

FIGS. 3A to 3D each show block diagrams of additional exemplary embodiments of the IDINE utilized in the inventive system and method of FIG. 1;

FIG. 4 shows a functional block diagram of a first exemplary embodiment of an operational infrastructure of the inventive system and method of FIG. 1;

FIG. 5 shows a functional block diagram of a second exemplary embodiment of an operational infrastructure of the inventive system and method of FIG. 1;

FIGS. 11A to 11H each show process flow diagrams of various exemplary embodiments of novel processes, selectively performed by the inventive system of FIG. 1 or FIG. 10, for providing IDINE functionality, and that may be utilized in operation of the inventive systems and methods of FIG. 1 and FIG. 10;

FIGS. 12A to 12C each show process flow diagrams of various exemplary embodiments of novel processes, selectively performed by the inventive system and method of FIG. 1 or of FIG. 10, for modifying an IDINE.

SUMMARY OF THE INVENTION

Figure 1:
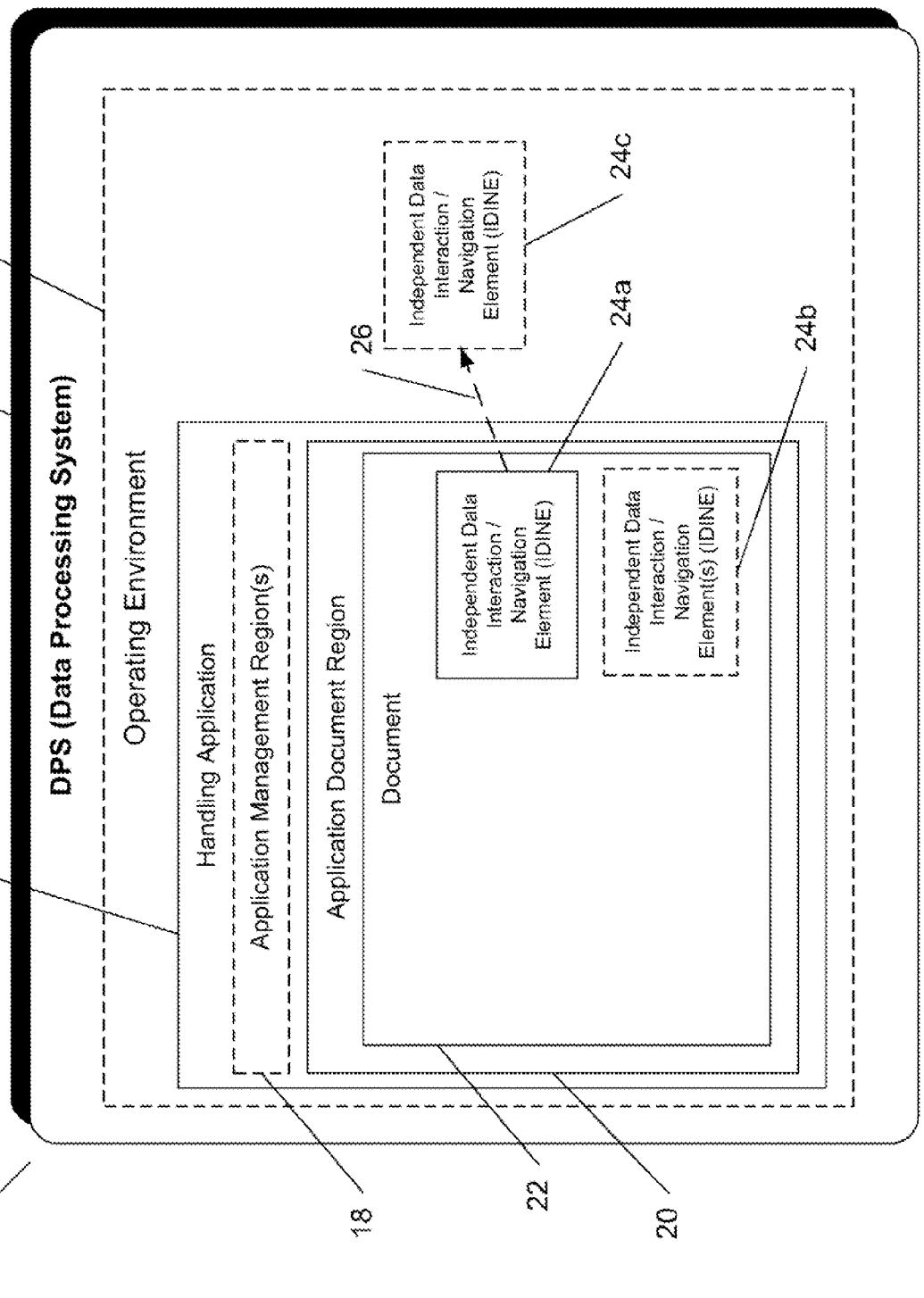
FIG. 1 shows a block diagram of a first embodiment of the inventive system and method for enabling at least one additional independent concurrent data navigation/interaction activity within the document.

The inventive system and method are directed to novel embodiments of various tools and infrastructures that enable a user of a document viewed on a data processing system using a document handling application, to engage in at least one additional concurrent data navigation/interaction activity in the document, and/or in the application handling the document, without affecting the user's document interaction activities. In the preferred embodiment of the invention, the inventive system and method are implemented by enabling the handling application to present the document along with at least one Independent Data Interaction/Navigation Element (IDINE), that includes a display component for displaying (and optionally enabling interaction with) any data (content) provided thereto, and a control component for navigating the provided content. Advantageously, the novel system and method ensure that utilizing any particular IDINE to navigate content provided thereto, does not affect the user's ability to navigate or interact with content in the document, or in other IDINEs (if any are present). The system and method of the present invention also provide a number of novel techniques for implementing and modifying IDINEs, and also provide multiple advantageous IDINE-related infrastructures, having additional benefits to parties involved in IDINE use, implementation, and content provision thereto.

Other objects and features of the present invention will become apparent from the following detailed description considered in conjunction with the accompanying drawings. It is to be understood, however, that the drawings are designed solely for purposes of illustration and not as a definition of the limits of the inventions for which reference should be made to the appended claims.

DETAILED DESCRIPTION OF PREFERRED EMBODIMENTS

The system and method of the present invention remedy the disadvantages of previously known document-related content interaction and navigation approaches, by enabling users to engage in at least one additional concurrent data navigation/interaction activity in the document, and/or in the application handling the document, without affecting the user's document interaction activities, thus addressing the key flaw of previously known approaches, The inventive system achieves its objective by enabling the user to access one or more independent data interaction/navigation elements (IDINEs) that are preferably added to a document as part of its structure, but that may also be added to the application handling the document, or an operating environment, or added to any combination of a document, its handling application and operating environment. While an IDINE may have a variety of features and capabilities, it includes at least two components—a data display/interaction component for displaying content and enabling interaction therewith, and a control component that includes at least one navigation control that may be used to navigate the content displayed in the other component independently of any content in the document or in other IDINEs that may be present. Advantageously, the user of a document is then able to interact with various content in the document, and at the same time navigably interact with content in one or more IDINEs that may be present in the document, and/or in the handling application, without navigating away from the document.

The inventive system and method also provide various exemplary embodiments of IDINE functionalities and configurations, as well as multiple exemplary embodiments for the infrastructure and novel process steps for implementing and modifying the IDINE. In addition, the inventive system and method offer a number of novel embodiments of IDINE utilization infrastructures and relationships between document owners, content and document end-users, and parties that provide content and IDINE-related services, that result in significant and novel benefits for one or more of the involved parties.

While the inventive system and method are described below, in connection with certain drawing figures and exemplary embodiments, as being advantageously configured for use with website documents and Internet-based content, and as having other Internet-related aspects, it should be understood to one skilled in the art, that the inventive system and method may be readily and advantageously utilized for enabling concurrent independent data interaction/activities in any type of document and in any type of document handling application regardless of the location, source, or ownership of the document, the IDINE, or of the content provided thereto, without departing from the spirit of the invention as a matter of necessity or design choice. Similarly, while the descriptions of various embodiments of the inventive system and method interchangeably refer to various data processing systems used in conjunction therewith as "computers", should be noted that any system with similar capabilities necessary for performing the tasks required by the inventive system and method, may readily be used as a matter of necessity or design choice without departing from the spirit of the invention.

Before describing the various embodiments of the inventive system and method, and the components, infrastructure, and operation in greater detail, it would be helpful to provide the definitions of certain terms used in the drawing figures and in the accompanying descriptions. Table 1 below, contains summary of definitions of commonly used terms within the context of the description of the various embodiments of the present invention.

Because the currently used terminology that may be utilized to describe the various embodiments of the novel system (and its functionality), evolves and changes rapidly, for the purposes of clarity, and without departing from the spirit of the invention, the various elements, components, infrastructures, and process steps of the inventive system and method, are described in Tables 1 and 2, and further below, in terms of their required or desired functionality, and/or in terms of objectives they are intended to accomplish in accordance with the present invention, rather than as specific structural and process implementations, which may change with advances in information systems technology. For example, as computers of various types are well known in the art, it is presumed that any computer used in conjunction with the present invention will include the typical components necessary for its operation, e.g., one or more CPUs, memory, long term data storage, and, in cases of computers typically utilized by end-users, one or more input devices, a display, and so on.

In Table 1, under each listed term, information relating to the location and identification of the reference number of that term in the enclosed drawing figures is also provided.

TABLE 1

(Definitions/Terminology)

| # | Term | Definition |
|---|---|---|
| 1 | DPS (Data Processing System)<br>FIG. 1: (12)<br>FIG. 4: (152)<br>FIG. 5: (202)<br>FIG. 6: (302, 306, 310, 318; 322; 328, 332, 336, and 340)<br>FIG. 9: (602)<br>FIG. 10 (702) | For the purposes of the present invention, a data processing system is defined as any system having at least some of the following capabilities:<br>1. storing data and applications for issuing instructions (for example in form of application programs);<br>2. in response to issued instructions, performing tasks involving data stored therein or provided thereto;<br>3. displaying information relevant to its operation and the performed tasks;<br>4. communicating with at least one other data processing system; and<br>5. a device for receiving instructions from an operator (such as an input device).<br>In accordance with the present invention, the term "data processing system" can also refer to a collection of two or more interconnected data processing systems having the above capabilities By way of example, computers ranging from pocket-sized personal digital assistants (PDAs), and smart telephones to personal desktop or notebook computers, to high power servers and server networks, are the most common types of data processing systems and readily possess all the capabilities necessary for operation of various embodiments of the inventive system and method. Accordingly, the data processing systems shown in various embodiments of the present inventions, are preferably computers (with the specific type, capabilities, and configuration thereof, being determined as a matter of necessity and/or design choice - i.e., personal computers or PDAs may be sufficient for end-users, but high powered servers may be necessary for data and document providers).<br>However, it should be noted that any system, even if falling outside the conventional definition of a "computer", may be utilized as a data processing system in accordance with the present invention, without departing from the spirit of the invention, as long as such a system posses the necessary capabilities from (1) to (5) above. |
| 2 | Operating Environment<br>FIG. 1: (16)<br>FIG: 10: (706) | An operating environment is a set of instructions provided to a data processing system (for example stored thereon as an application program or programs), that defines the actual and potential capabilities of a data processing system and its user interface, and which enables other applications used by the data processing system and the various components of the data processing to perform their designated functions.<br>In the field of computers, an operating environment is commonly referred to as an "operating system". Examples of operating systems include, but are not limited to various versions of Windows ®, LINUX, MacOS ®, Solaris ®, etc. As a rule, existing operating systems constantly evolve and new operating systems are occasionally introduced.<br>For the purpose of the present invention, any operating environment (e.g., operating system) that supports the necessary capabilities of the appropriate data processing system (e.g., computer), may be readily utilized without departing from the spirit of the invention. |
| 3 | Data/Content | Data, is any type of information in any number of formats which may be, in whole or in part, interacted with (e.g., viewed, modified, reviewed, etc.), generated, acquired, analyzed, deleted, reviewed, and/or otherwise processed by a data processing system. For example, data may include, but is not limited to, one or more of the |

TABLE 1-continued (Definitions/Terminology)

| # | Term | Definition |
|---|---|---|
| | | following: text, images, audio, video, transactional information, instrument or sensor readings (e.g., medical, scientific, military), links to other data, executable programs and supporting files, etc. Additionally, data may be static, interactive, or a combination of both. While the term may be used interchangeably with "data", "content" preferably represents certain desirable data that is of interest to one or more parties, and that may be provided thereto during the operation of the inventive system. |
| 4 | Document<br>FIG. 1: (22)<br>FIG. 4: (156)<br>FIG. 5: (206)<br>FIG. 7: (406, 428)<br>FIG. 8: (502, 514, 522, 530)<br>FIG. 9: (608)<br>FIG. 10: (712) | For the purpose of the present invention, a document is defined as a virtual structure used in a data processing system for enabling data to be created, viewed, organized, edited, formatted, stored, deleted, and otherwise interacted with. Commonly, documents are stored on a data processing system in form of one or more "files" that may be opened and interacted with by using an application program (see definition #7 of "Handling Application" below).<br>A document may include a single type of data (e.g., a text file, or an image), or it may include a wide variety of data types, and may itself include multiple documents and defined relationships therebetween (e.g., an elaborate Internet website with content feeds and other features, an interactive multimedia presentation, or a complex spreadsheet with macros). Thus, for example, the term "document", as used herein can refer to a single individual data item, such as a bitmap image, to one or more dynamic content feeds and/or to an interactive directory of other documents, etc.<br>In addition, a document may be static - changeable only by editing it (e.g., a website with specific text and pictures content), or dynamic - changing on a continual basis, (e.g., incorporating constantly updated new content, for example, if the document is a website, through use of content feeds (XML, Podcasts, RSS, etc.)), or changing as a result of user interaction (e.g., when the user completes a form, etc.). |
| 5 | Document_Code | The term "Document_Code" is defined as a set of instructions, representative of a particular document's structure, features, content, functionality, ownership, and other characteristics, that are executed by a data processing system under direction of an appropriate handling application (see definition #7, below), to present that document to a user for interaction therewith. |
| 6 | DOC_Presentation | The term "DOC_Presentation" is representative of how a document is presented to the user by the handling application, based on the Document_Code supplied thereto. Thus if the Document_Code is revised to instruct the handling application to provide the document with a new feature, the handling application presented with the revised Document_Code will provide the new feature to the user in DOC_Presentation. Depending on the nature of the Document_Code, the handling application and/or other factors, different DOC_Presentations may be generated for different users from the same Document_Code.<br>For example, a webpage at a particular Internet address (URL) is represented by a set of HTML code (i.e., Document_Code). When a user visits the URL, the handling application is presented with the HTML code and renders it to generate a DOC_Presentation for the user that enables the user to view and interact with the webpage. However, if the user's handling application is missing support for a certain feature indicated in the Document_Code, the DOC_Presentation |

TABLE 1-continued (Definitions/Terminology)

| # | Term | Definition |
|---|------|------------|
| | | generated for the user would be different, or in certain cases, the handling application may be unable to generate the DOC_Presentation at all. |
| 7 | Handling Application<br>FIG. 1: (14)<br>FIG. 4: (154)<br>FIG. 5: (204)<br>FIG. 7: (408, 430)<br>FIG. 9: (604)<br>FIG. 10: (704) | A handling application is a set of instructions implemented in the operating environment of a data processing system, that has the necessary functionality to "handle" one or more types of documents, at a minimum by generating an appropriate DOC_Presentation based on Document_Code supplied thereto. "Handling" may also refer to any document-related actions, such as document creation, editing, deletion, interaction therewith, changing, adding, and using document features. |

As noted above, while many advantageous embodiments of the inventive system and method are described below in connection with the various drawing figures, the core aspect of the present invention is making one or more IDINEs available to an end-user of a document. An end-user is the party that is expected to interact with, and/or to otherwise utilize the provided document and the content made available through one or more IDINEs. However, in certain embodiments of the present invention, rather than simply being the "target audience" for document and the IDINE(s), the end-user may actually be the party that provides one or more IDINEs to their document and/or to their handling application, and/or also be the party that supplies content to their IDINE(s). The various possible roles of an end-user in connection with implementation of various embodiments of the inventive system and method, are discussed in greater detail below in connection with FIGS. 4 to 8, FIGS. 11A to 12C, and FIG. 13 (see also Table 2, definition #12, below).

Figure 2:
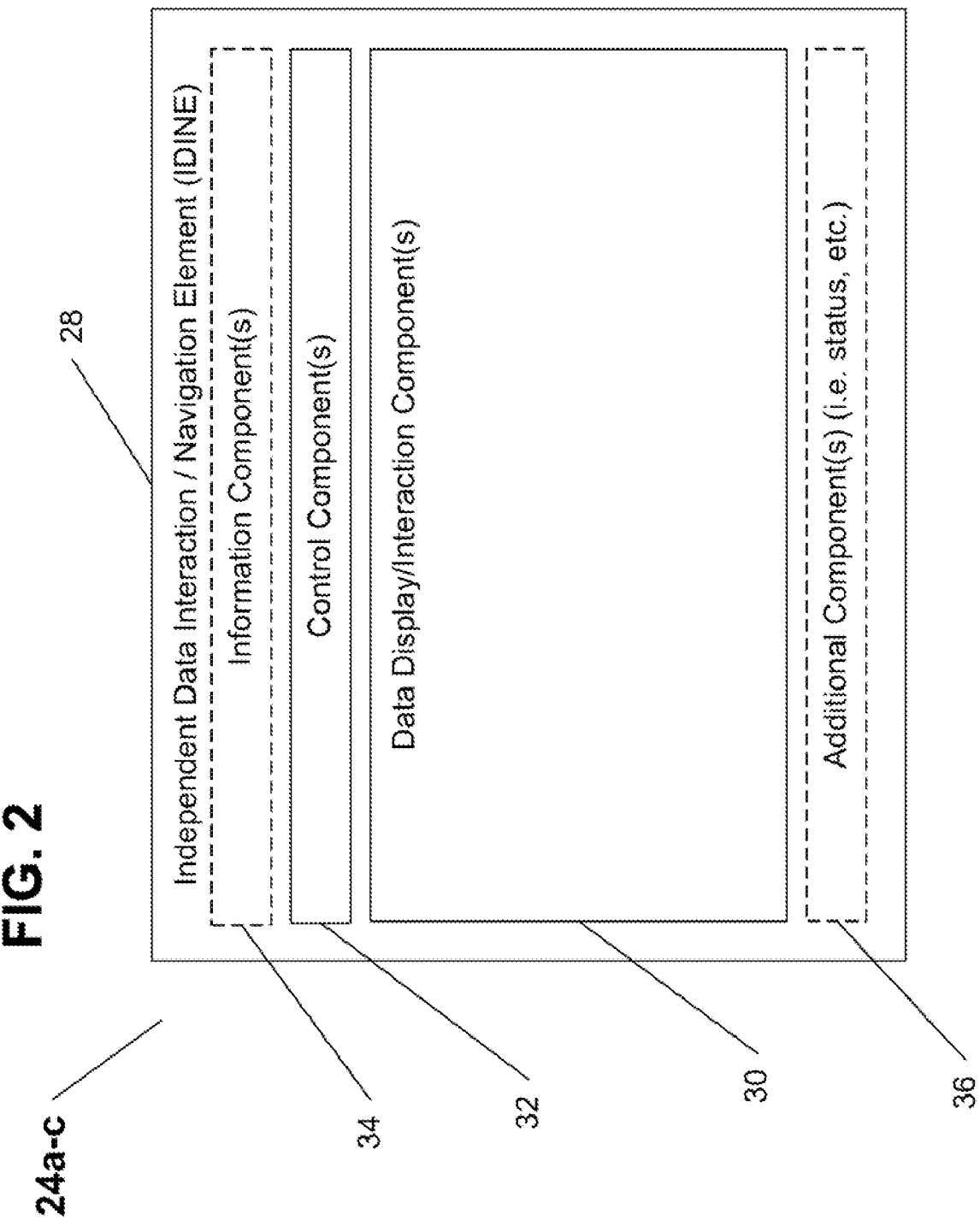
FIG. 2 shows a block diagram of an exemplary embodiment of an independent data interaction/navigation element (IDINE) utilized in the inventive system and method of FIG. 1.

Referring now to FIGS. 1 and 2, a first exemplary embodiment of the inventive system, in which at least one IDINE is provided for a document without affecting the handling application, is shown in FIG. 1 as an inventive independent content interaction (ICI) system 10. The ICI system 10 includes a data processing system (DPS) 12, (see Table 1, definition #1), which may be a computer system, ranging from a pocket-sized computer to a notebook or desktop computer, to a network of computer servers. It is well known that features and configurations of computers vary greatly, but in most cases computers include components for storing data and programs, one or more displays for displaying information, and one or more components for allowing interaction therewith (for example, a keyboard and a pointing device).

The DPS 12 is preferably capable of executing a handling application 14 (see Table 1, definition #7) directly, or within an optional operating environment 16 (see Table 1, definition #2). While most commonly available computers require an operating environment (e.g., an operating system) in order to execute applications, if the DPS 12 is capable of executing the handling application 14 directly (for example, if the application is at least partially hard-coded), the operating environment 16 may be unnecessary.

The handling application 14 may be a software program, or equivalent that enables the end-user to interact with a document 22 (see Table 1, definition #4), displayed thereto in an application document region 20. The handling application 14 may include one or more optional application management regions 18 that may be positioned anywhere within the application 14, and in which various application 14 management components may be implemented. For examples if the application 14 is a web browser, the application management region(s) 18 may include one or more of the following components: a title bar where the title of the document 22 shown in the document region 18 is displayed, an address bar for entering or viewing the location of the desired document 22, navigation and configuration controls, a status bar, a search bar and one or more additional toolbars that provide access to various handling application 14 features. As noted above in Table 1, definition #4, the document 22 contains data (see Table 1, definition #3) with which the end-user can interact through the handling application 14.

The ICI system 10 also includes an independent content interaction/navigation element (IDINE) 24a, that enables the end-user to navigate and interact with any content provided thereto, without affecting the end-user's ability to concurrently utilize the handling application 14 to interact with any content present in the document 22 (see Table 2, definitions #8 to #12)

In one embodiment of the present invention, the IDINE 24a may be implemented as feature that is provided with the DOC_Presentation of the document 22, by the handling application 14, in form of a configurable region, defined in the Document_Code and shown in a portion of the DOC_Presentation, that, at a minimum includes at least two components that are displayed to a document user (as shown in FIG. 2):

(1) a data display/interaction component 30, that may be an appropriately sized region for displaying content delivered to the IDINE 24a (and optionally for interacting with that content directly), and (2) a control component 32, that includes at least one data navigation control, for navigating the content displayed by the data display/interaction component 30 without utilizing navigation controls of the handling application 14 that may be present in the application management region 18.

The data display/interaction component 30, is essentially equivalent in functionality to the handling application document region 20, and may be sized and configured as appropriate for the content delivered thereto.

For examples if the document 22 is a website, and the content provided to the IDINE 24a is web-log (e.g., a blog), the end-user may navigate back and forward within the blog, and, if the IDINE 24a includes an appropriate component, perform a search for other content—without navigating away from the document 22, and without affecting the user's ability to interact with the document 22. The document 22 may include one or more additional IDINE(s) 24*b*, positioned in various portions of the DOC_Presentation of the document 22, and capable of enabling the end-user to navigate and interact with content provided thereto without affecting the user's ability to interact with content in the document 22, or to navigate/interact with content in IDINE 24*a*.

Additionally, the capability of the IDINE 24*a* to enable independent interaction with content delivered thereto, enables advantageous utilization of multiple IDINEs in the document 22, and also enables utilization of "nested IDINEs"—for example the IDINE 24*b* may be positioned within the data display/interaction component 30 rather than elsewhere in the document 22 DOC_Presentation.

Because of the typical size of the data display/interaction component 30, the IDINE 24*a* is particularly suitable for handling content formatted for portable devices, such as pocket computers and/or mobile telephones. Use of such content can be advantageous for content providers who would benefit from increased demand for their content, and also would eliminate the need for formatting content for display in the data display/interaction component 30. Similarly, XML content is also particularly well-suited for use in the IDINE 24*a*.

It should be noted that if the end-user uses the handling application 14 to navigate away from the document 22 to another document, the end-user would naturally lose access to the IDINE 24*a*, as it would not be present in the other document. To address this possibility, in one embodiment of the ICI system 10, the IDINE 24*a* may be provided with an end-user accessible "launch" feature 26, that when activated by the end-user, creates a floating IDINE 24*c* corresponding to the IDINE 24*a* (or to another predefined IDINE), such that the IDINE 24*c* is independent of the document 22 and the handling application 14. Thus, the IDINE 24 would not be affected by the end-user navigating away from document 22 to another document. In one alternate embodiment, the launched IDINE 24*c* may be deactivated it the handling application 14 is closed. In another alternate embodiment, the launched IDINE 24*c* may be kept active even when the handling application 14 is closed.

The IDINE 24*a* may be implemented through one or more novel IDINE implementation processes of various embodiments described below in connection with FIGS. 11A to 11H. Additionally, the IDINE 24*a* may be readily modified through one or more novel IDINE modification processes of various embodiments described below in connection with FIGS. 12A to 12C.

In yet another embodiment of the present invention, the IDINE 24*a* and/or the content provided thereto, may be automatically modified based on certain predetermined context-based criteria. For example, if the IDINE 24*a* is configured for receiving movie information, specific movie information content may be selected for delivery thereto based on the zip code of the end-user such that only relevant movie showtimes are displayed. In another example, if the content provided to the IDINE 24*a* is from a newspaper publisher, the publisher may modify the IDINE to include a "subscribe" control component to enable the end-user to conveniently subscribe to the newspaper, Various embodiments of novel IDINE contextualization processes are described below in connection with FIG. 13. In yet another example, the content provided to the IDINE_24*a* may be modified based on IDINE_24*a* configuration, for example if the IDINE_24*a* configuration information states that a particular content address points to an RSS feed.

Alternately, as discussed in greater detail below in connection with FIG. 10, rather than being added to the DOC_Presentation of the document 22, an IDINE may be added to one or more regions of the handling application 14 that are proximal to the document 22, by modifying the handling application 14 (for example, by providing an appropriate "module" or "plug-in" thereto).

Referring to FIG. 2, in addition to the above-described components 30 and 32, the IDINE 24*a* may include, but is not limited to, one or more of the following components:

1. one or more additional data display/interaction components 30 of similar or varying configurations;
2. one or more additional control components 32, of similar or varying configurations that may be implemented as static or configurable toolbars, or as other end-user-selectable controls, such as drop-down menus, etc. Each of the additional control components may include, but is not limited to, one or more of the following controls:
    a. control for navigating the content delivered thereto (e.g., "forward" and "back" buttons);
    b. control for managing the operation of the IDINE 24*a* (e.g., launch control);
    c. "return" control for navigating the back to the original content provided to the IDINE 24*a*;
    d. control for presenting IDINE 24*a* content in a hierarchical navigable directory format;
    e. control for viewing the current configuration and settings of the IDINE 24*a*;
    f. control for configuring and/or for changing the configuration of the IDINE 24*a* (e.g. for changing its appearance through use of a graphical "skin", for changing its size and/or position, for re-arranging and/or resizing its components, etc.);
    g. control for providing secure login capabilities;
    h. control for entering the location of desired content so that the end-user can utilize the control component 32 to navigate thereto;
    i. control for performing a data search in free form or by first selecting a search engine or tool from a predefined or configurable set thereof;
    j. control for creating a new IDINE within the control component 32, for example by either generating a new IDINE entirely, or by copying the IDINE 24*a* and then enabling the end-user to make modifications to the copy (see FIGS. 11A to 11H and accompanying descriptions below);
    k. control for saving the current configuration and settings of the IDINE 24*a*;
    l. control for enabling a payment to be made to the provider of the IDINE 24*a* and/or to the provider of content thereto, and
    m. a control for accessing an IDINE 24*a* "help" information, if available;
3. one or more information components, for example for displaying certain information to the user, other than the content, such as a title or name of the IDINE, or of a document within it, a logo or other graphic, and/or for displaying predetermined promotional, or other content to the user outside of the component 30; and
4. one or more additional components, for example including, but not being limited to: a status component for indicating the status of the IDINE to the user, etc.

It should be noted that the functionality and capabilities of the inventive IDINE are practically limited only by the functionality and capabilities of the handling application, of the operating environment, and of the data processing system. Thus, an IDINE can readily take advantage of any future functionality, document-related technology, a new type of document, and/or a new type of content, as long as the handling application, the operating environment and the data processing system support such future functionality/technology document/content. Accordingly, the IDINE 24*a* can readily include any component having equivalent functionality to components of the handling application 14. For example, the IDINE control component 32 can also include controls for content bookmarking, if the handling application 14 provides such a capability, etc. Furthermore, as shown in exemplary embodiments of IDINEs 100, 110, 120 and 130, in FIGS. 3A to 3D, the various IDINE 24*a* components may be selected, sized and positioned anywhere with the IDINE, without departing from the spirit of the invention, Before describing the various exemplary embodiments of the novel ICI system operational infrastructure for configuring an IDINE, and for arranging content delivery thereto, shown in FIGS. 4 to 9, it would be useful to provide definitions of certain terms used in describing the novel ICI system operational infrastructure and architecture, and well as to provide expanded definitions of previously discussed terms. Referring to Table 2 below, under each listed term, information relating to the location and identification of the reference number of that term in the enclosed drawing figures is also provided.

TABLE 2

(Additional Definitions/Terminology)

| # | Term | Definition |
|---|---|---|
| 8 | IDINE_Code | The term "IDINE_Code" represents a modification made to the Document_Code (and/or to the handling application) that enables the handling application to provide at least one IDINE of a particular configuration in the DOC_Presentation (and/or in one of its predefined regions).<br>The various embodiments in which the IDINE_Code may be implemented are described in greater detail below in connection with FIGS. 11A to 11H. |
| 9 | IDINE_Config | "IDINE_Config" represents a collection of parameters that define the configuration/customization information for an IDINE to be provided with the DOC_Presentation of a particular document (or in a particular region of the handling application). Thus, IDINE_Config may include, but is not limited to: IDINE size and position in the DOC_Presentation, which IDINE components are used and their orientation, the source(s) where the IDINE is to obtain data/content, etc . . .<br>Essentially, the IDINE_Config represents the desirable characteristics of an IDINE for a DOC_Presentation of a particular document (or documents).<br>The IDINE_Config for any particular IDINE may be determined by a variety of embodiments described in greater detail below in connection with FIGS. 11A to 11H. |
| 10 | IDINE_IMP_Code | "IDINE_IMP_Code" represents instructions, generated based on particular IDINE_Config, that when presented to a handling application, cause the handling application to provide at least one IDINE in the DOC_Presentation (and/or in one of its predefined regions) having characteristics determined by the particular IDIE_Config.<br>The resources and parties responsible for generating and providing the IDINE_IMP_Code to the handling application may vary depending on a particular embodiment of the present invention, as described in greater detail below in connection with FIGS. 11A to 11H.<br>In certain cases, the IDINE_IMP_Code and the IDINE_Config may be intermingled as a single set of code. |
| 11 | IDINE_PRV_Code | "IDINE_PRV_Code" represents instructions that, when presented to a handling application, cause the handling application to take certain predetermined steps to obtain IDINE_IMP_Code, such that the handling application can then provide at least one IDINE in the DOC_Presentation based thereon.<br>The IDINE_PRV_Code may be implemented in a variety of embodiments described in greater detail below in connection with FIGS. 11A to 11H. |

TABLE 2-continued (Additional Definitions/Terminology)

| # | Term | Definition |
|---|---|---|
| 12 | Data Source<br>FIG. 4: (160, 162)<br>FIG. 5: (210)<br>FIG. 9: (616, 622, 634) | In accordance with the present invention, the term "data source" refers to the source that provides data/content to the IDINE (and/or to the document in which the IDINE is present), both in terms of the physical origin and location of the data, and, in certain cases, also in terms of the party, or parties, that control, or "own" the data, and/or the document which contains the data and access thereto (see definition #14 of "Document Provider" and definition #15 of "Data Provider", below).<br>By way of example, a data source may include, but is not limited to, one or more of the following:<br>1. document content provided in its DOC_Presentation, and on the same DPS, (for example, in a complex document, the user may view one portion of the document and use the IDINE to display and/or interact with content from other portions of the document);<br>2. one or more other documents stored on the same DPS;<br>3. one or more documents stored on one or more additional DPSs under control of a document provider, where at least a portion of the data in the documents may be generated by the document provider, and/or generated and controlled by one or more separate data providers; and<br>4. one or more data feeds from one or more additional DPSs under control of one or more data providers.<br>Preferably, the data source transmits content in a format accessible by the handling application that delivers the content to the document and the IDINE, but processing (e.g. formatting, etc.), if necessary, may be performed at least in part by other systems. |
| 13 | IDINE Source<br>FIG. 5: (212, 216)<br>FIG. 9: (618, 636) | In accordance with the present invention, the term "IDINE source" refers to the source responsible for managing (and in some cases, for at least partially performing) the tasks necessary to provide IDINE_IMP_Code to a handing application for provision in the DOC_Presentation of a particular document (or in a particular region of the application), Preferably, an IDINE source is defined in terms of a DPS used to perform the tasks necessary to generate and implement the IDINE (i.e., by generating and delivering, to a handling application, appropriate IDINE_IMP_Code based on IDINE_Config information provided thereto). An IDINE source may also be defined in terms of the party or parties that control or own:<br>The DPS (or DPSs) that enables generation of IDINE_IMP_Codes, and/or that assists parties in generating IDINE_Config information for desired IDINEs, and/or<br>certain IDINE functionality (through control of provided IDINE_IMP_Codes),<br>specific IDINE configurations, and/or IDINE components.<br>(see definition #16 of "IDINE Provider", below).<br>By way of example, an IDINE source may include, but is not limited to, one or more of the following:<br>1. Manual modification of Document_Code of a document (for example by an authorized party, such as the document owner), by providing and inserting an IDINE_Code that includes an IDINE_IMP_CODE instructing the handling application to provide an appropriate IDINE with the DOC_Presentation of that document;<br>2. the DPS on which the document is stored, where the user is the document owner (or is otherwise authorized to make changes to the Document_Code) also acting as the IDINE provider; and<br>3. one or more other DPSs, under control of an IDINE provider, that can: |

TABLE 2-continued (Additional Definitions/Terminology)

| # | Term | Definition |
|---|---|---|
| | | a. perform the tasks necessary to enable a handling application to provide an IDINE for a DOC_Presentation (or in one of its predetermined regions), for example by generating and providing appropriate IDINE_IMP_Code, <br> b. enable parties to configure and/or modify an IDINE; and <br> c. optionally provide other IDINE functionality and features (such as contextualization - see FIG. 13 and accompanying description). |
| 14 | IDINE Component Source <br> FIG. 5: (218) <br> FIG. 9: (620) | While in most cases the IDINE source is also the source of IDINE_IMP_Code that provides sourced IDINEs with any necessary or desirable IDINE components, in certain embodiments of the present invention, one or more IDINE components for an IDINE, may be provided by a separate IDINE component source, that has, for example, developed, and/or that owns, one or more advantageous IDINE components that may not be available from IDINE source(s). <br> In one embodiment of the present invention, implementation of a specific IDINE component may be represented by a corresponding segment of IDINE_IMP_Code (or, alternately, a segment of IDINE_Config), that is used to modify the IDINE_IMP_Code of an particular IDINE to cause the handling application presented with the modified IDINE_IMP_Code to include the specific IDINE component in the IDINE that is provided in the DOC_Presentation. |
| 15 | End-User <br> FIG. 6: (304, 338) <br> FIG. 7: (448, 454) <br> FIG. 8: (570) | In accordance with the present invention, as noted above, the term "end-user" refers to the party that is expected to interact with, and/or to otherwise utilize the document and IDINE (and components thereof) through the DOC_Presentation. In some cases (for example when a document is a local file stored on the end-user's DPS or on another DPS accessible by the end-user), the end-user may be able to add an IDINE to the DOC_Presentation (for example, if the user "owns" the document, or is otherwise authorized to make necessary changes to the Document_Code), and may essentially act as a both the document provider, and as the IDINE provider. <br> In other cases, where the document is owned by the document provider and stored/hosted on the document provider DPS, the end-user may be able to view and interact with the document and the IDINE in the DOC_Presentation, and possibly change certain predefined document and/or IDINE preferences, but would not otherwise be able to change the document or the IDINE, or to add an IDINE through modifying the Document_Code. <br> For example when an end-user accesses a website over the Internet, a copy of the Document_Code for the website is temporarily downloaded to the end-user's DPS and rendered by their web browser (i.e., the handling application) as an interactive webpage (e.g., DOC_Presentation). The user can interact with the DOC Presentation, and utilize any IDINE provided thereto. However, because the end-user does not have access to original Document_Code (only to a local copy used to generate the DOC_Presentation), the end-user would not be able to add a new IDINE to the DOC_Presentation, and would only be able to make "permitted" changes to an existing IDINE (e.g., to change its appearance with a "skin" or a "theme", or to relocate one or more of its components). <br> Alternately, if the end-user's handling application is equipped with a feature that supports implementation of an IDINE in the application, then the end-user would be able to add an IDINE to the DOC_Presentation without having to access the original Document_Code. |

TABLE 2-continued (Additional Definitions/Terminology)

Figure 6:
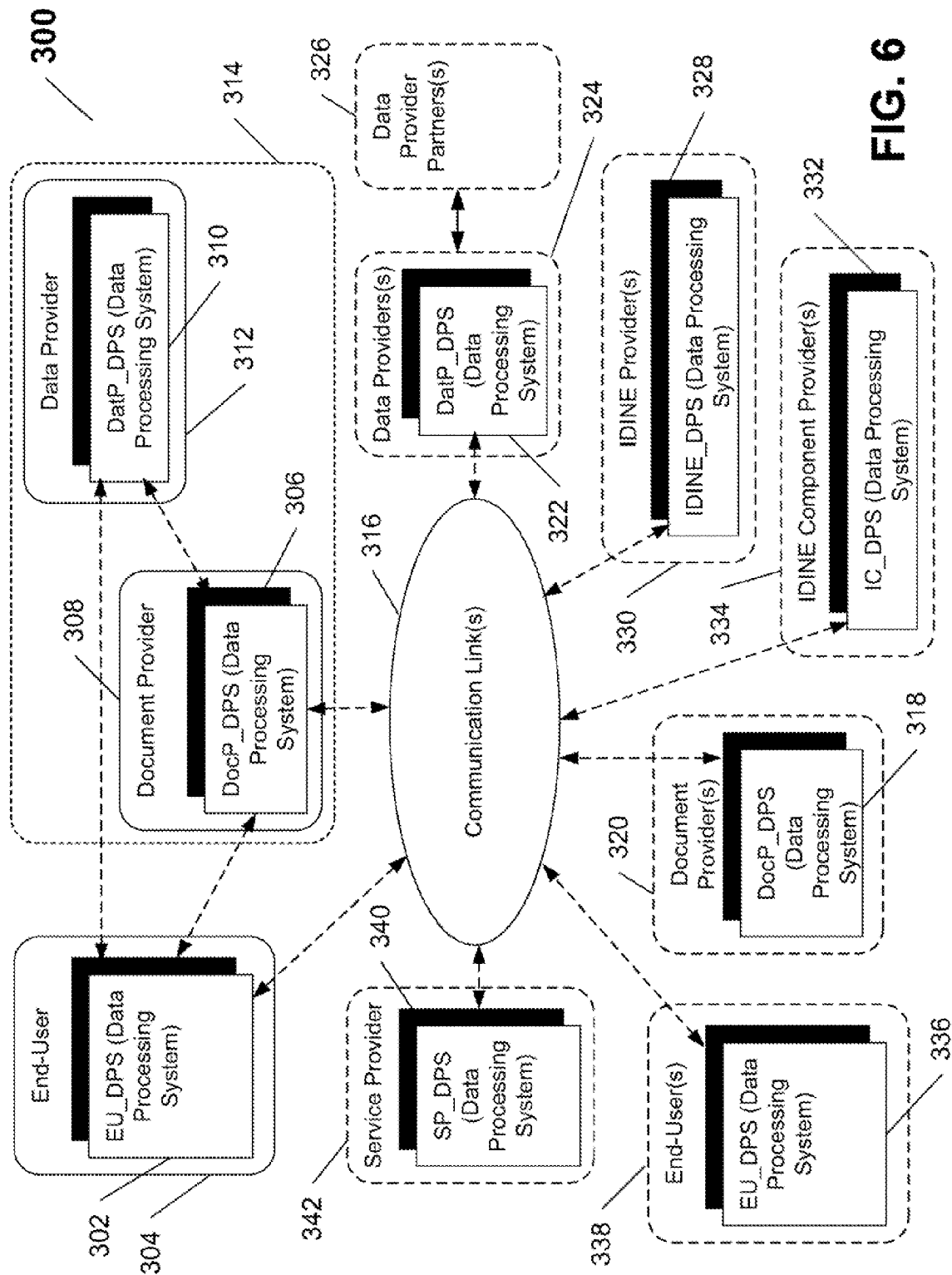
FIG. 6 shows a block diagram of an exemplary embodiment of an architecture of the inventive system and method of FIG. 1.

| # | Term | Definition |
|---|------|------------|
| 16 | Document Provider<br>FIG. 6: (308, 320)<br>FIG. 7: (402)<br>FIG. 8: (504, 512, 520, 528) | In accordance with the present invention, the term "document provider" refers to the party that has control over, and that provides the document (in form of Document_Code with IDINE_Code) to the end-user for interaction therewith, through the corresponding DOC_Presentation generated by the end-user's handling application. In certain cases, the document provider and the end-user may be the same party (e.g., if the document is under sufficient control of the end-user to make significant changes to the Document_Code (e.g., to add IDINE_Code) - ultimately, any document provider is likely also an end-user of their own document(s)).<br>The document provider also determines the data source(s) (and data provider(s)) for their documents, and for any related IDINEs, and arranges for desired content to be delivered thereto, by configuring the IDINE(s) (by providing appropriate IDINE_Code) to properly handle the delivered content. |
| 17 | Data Provider<br>FIG. 6: (312, 324)<br>FIG. 7: (424, 446)<br>FIG. 8: (510, 564) | In accordance with the present invention, the term "data provider" refers to the party that has control over, and that provides the data (content) to an IDINE, and optionally to the document in which DOC_Presentation the IDINE is implemented. In certain cases, the data provider and the document provider may be the same party, for example, if the document provider generates the data for their document(s), and/or for their IDINE(s). Similarly, in other cases the data provider and the end-user may be the same party, for example, if the end-user is also the document provider who generates their own data for their document(s), and/or for their IDINE(s).<br>In yet other cases, a data provider may simply be an additional document provider owning a data source (such as a document stored on their DPS) having desirable content therein, with the desirable content being provided to the IDINE in the DOC_Presentation of a document of a particular document owner. Alternately, a data provider may be a party that controls a data source providing content (processed or unprocessed), in one or more formats, to various document sources for delivery to, and access by, the IDINE, the document, or by both. |
| 18 | Data Provider Partner<br>FIG. 6: (326) | In accordance with the present invention, the term "data provider partner" refers to a party that has ownership rights in certain proprietary data, and that grants the right to a data provider (or to another party serving as a data source) to distribute at least a portion of the proprietary data under predefined terms and conditions.<br>For example, a sports league that owns rights to game-related information, can grant the right, to a sports information service, to provide game result and commentary score information and thus serve as a data provider to sports-related websites (the document providers).<br>Alternately, the data provider partner may be a "branding" partner, where instead of providing proprietary data, and/or rights thereto, the provider partner grants the right to use a certain trademark or trade dress to a particular party or parties for use in conjunction with the content, the IDINE, an/or components thereof. For example, if the data provider partner owns a trademark in a particular luxury brand, they may grant the right to a particular party to supply an IDINE with a graphical "theme" based on the luxury brand. |
| 19 | IDINE Provider<br>FIG. 6: (328)<br>FIG. 7: (422, 444)<br>FIG. 8: (550, 562) | In accordance with the present invention, the term "IDINE provider" refers to the party that has control over an IDINE source, and that selectively authorizes provision of data processing and related services necessary to obtain an IDINE_Code, a IDINE_IMP_Code, an IDINE_PRV_Code, and/or IDINE_Config.<br>In certain cases, the IDINE provider and the document |

TABLE 2-continued (Additional Definitions/Terminology)

| # | Term | Definition |
|---|------|------------|
| | | provider may be the same party, for example, if the document provider generates the data for their document(s) and/or for their IDINE(s). Similarly, in certain cases, the IDINE provider and the end-user may be the same party, for example, if the end-user is also the document provider who generates their own IDINE_IMP_Code for their document's IDINE_Code. In other cases, the IDINE provider may also be a data provider. |
| 20 | Modification Permission Protocol | In accordance with the present invention, the term "Modification Permission Protocol" refers to a set of rules that govern the rights of each party (i.e., end-user, document provider, IDINE provider and data provider) to create, configure, and modify an IDINE. The composition and scope of a particular Modification Permission Protocol may be as simple or as complex as desired by the party responsible for defining it. |
| 21 | IDINE Component Provider FIG. 6: (334) | In accordance with the present invention, the term "IDINE component provider" refers to the party that has control over an IDINE component source capable of providing IDINE components in addition to those available from IDINE sources, and that selectively authorizes provision of data processing and related services necessary to provide the IDINE_IMP_Code segment for an IDINE component to the appropriate party (e.g., to the IDINE provider who can then integrate the IDINE component into their selection of available IDINE components, or directly to a document provider). |
| 22 | Service Provider FIG. 6: (342) | In accordance with the present invention, the term "service provider" refers to the party that provides IDINE_Code and/or content-related data processing services to one or more of the other parties. In some embodiments of the inventive system, the service provider may provide certain data processing services (e.g., related to IDINE implementation, content formatting/rendering, etc.) that otherwise must be performed by one or more of the end-user, document provider, and/or data provider data processing systems. The involvement and utilization of a service provider may be particularly advantageous in implementation of certain computation-intensive IDINE configurations on a wide scale that require a great deal of data processing, and that would impose a severe load on the data processing systems of one or more of the other parties. In such situations, the service provider reduces or eliminates the need for the other parties to perform the required data processing (for example, if service provider is a transcoding proxy) |
| 23 | Independent Content Interaction (ICI) system operational infrastructure FIG. 1 (10) FIG. 4: (150) FIG. 5 (200) FIG. 7 (400) FIG. 8 (500) FIG. 9 (600) FIG. 10 (700) | The ICI system operational infrastructure defines the relationships and flow of information between the various parties (and their DPSs) involved in implementation and operation of the inventive system and method. |
| 24 | Independent Content Interaction (ICI) System architecture FIG. 6 (300) | The ICI system architecture defines the presence of, and possible interconnections between, the DPSs of various parties involved in implementation and operation of the inventive system and method, and supports the implementation and operation of: different embodiments of the novel ICI system operational infrastructures, and different embodiments of novel processes for implementing IDINEs, for modifying existing IDINEs, and for IDINE-related contextualization |

Referring now to FIG. 4, a first exemplary embodiment of the novel ICI system operational infrastructure for implementing an IDINE and for arranging content delivery thereto, is shown as an ICI system infrastructure 150, which includes a DPS 152, a handling application 154, a document 156, and an IDINE 158 (each of which may be substantially similar to the respective DPS 12, the handling application 14, the document 22, and the IDINE 24a, described above in connection with FIG. 1). The IDINE 158 may be configured by making modifications to the Document_Code based on the desired configuration thereof (as shown and described in FIG. 11A, and the accompanying description below). Content for the IDINE 158, may be provided from the document 154 itself (which is especially useful if the document 154 is complex) through a self-referencing data source 164. Content for the IDINE 158 may also be obtained from a local data source 160, such one or more other documents stored elsewhere on the data processing system 152. Alternately (or additionally), content for the IDINE 158 may be obtained from an external remote data source 162, such as website, a dynamic content feed source, a remote database, etc. Advantageously, the IDINE 158 may obtain content from one or more of the data sources 160 to 164, depending on the settings in the IDINE_Config.

Referring now to FIG. 5, a second exemplary embodiment of the novel ICI system operational infrastructure for implementing an IDINE, and for arranging content delivery thereto, is shown as an ICI system infrastructure 200, which includes a DPS 202, a handling application 204, a document 206, and an IDINE 208 (each of which may be substantially similar to the respective DPS 12, the handling application 14, the document 22, and the IDINE 24a, described above in connection with FIG. 1).

The IDINE 208 may be implemented in conjunction with an IDINE source 212 utilizing any of the IDINE implementation processes 810 to 880, described in greater detail below in connection with FIGS. 11A to 11H. Content for the IDINE 208, may be obtained through a data source 210 which may be remote from the DPS 202, or may be local (in the same manner as data sources 160 and 164 as shown in FIG. 4), Optionally, the IDINE 208 may be generated by, and receive content from, the same source—an IDINE & data source 214, which may be a website that is also capable of IDINE_IMP_Code generation based on, and in response to, a received IDINE_Config, and that may provide an appropriate interface to facilitate IDINE 208 generation. In addition, the IDINE 208 may receive one or more IDINE components from an optional IDINE component source 216, that may not available from the IDINE source 212 or the IDINE & data source 214. Optionally, one or more service providers 220 to 228 may be utilized in the ICI system infrastructure 200, to assist the data source 210, the IDINE source 212, the IDINE & data source 214, and/or the IDINE component source 216, with any necessary data processing services.

The inventive system and method are particularly advantageous when implemented in complex environments with vast amounts of available data, such as the Internet (e.g., the world wide web), where documents (e.g. websites) are the primary form of interacting with content. Referring now to FIG. 6, a first exemplary embodiment of the novel ICI system operational architecture for implementing scalable IDINE and content delivery, is shown as an ICI system architecture 300.

The ICI system architecture 300, demonstrates a number of exemplary alternate embodiments for IDINE implementation in a distributed data processing architecture, such as a network of individual or multiple DPSs, at least some of which are under control of parties other than the end-user (e.g., document provider, IDINE provider, data provider, etc.). Advantageously, the ICI system architecture 300 may be implemented in a closed network (e.g., a local area network (LAN), a wide area network (WAN), an intranet, etc.), in an open network (e.g., the Internet), or in a combination of open and closed networks (e.g., a LAN connected to the Internet).

In one exemplary embodiment, particularly suited for closed network implementation, the ICI system architecture 300 includes an end-user data processing system (EU_DPS) 302 utilized by an end-user 304, a document provider data processing system (DocP_DPS) 306 utilized by a document provider 308, and a data provider data processing system (DatP_DPS) 310 utilized by a data provider 312 as a data source (e.g., a data source 162 of FIG. 4, or data source 212, 214 of FIG. 5). Optionally, the document provider 308 and the data provider 312 may be the same party—a document and data provider 314, which may utilize the DatP_DPS 306 and DatP_DPS 310 separately, or together as single DPS (not shown).

The document provider 308 utilizes the DocP_DPS 306 to make one or more documents available to the end-user 304, who may use their EU_DPS 302 to communicate with the DocP_DPS 306 to view and interact with any document provided for their use thereon (e.g., by executing the handling application enabling the end-user to interact with the document and any provided IDINE(s)—see FIG. 1 and accompanying description). At least one of the documents preferably includes one or more IDINEs configured to receive content from the DatP_DPS 310. In this embodiment of ICI system architecture 300, the document provider 308 also serves as an IDINE provider by modifying their document to include one or more IDINEs and arranges to retrieve appropriate content for each provided IDINE from the DatP_DPS 310. The various ways in which the end-user 302 may interact with the document and the provided IDINE(s) is described above in connection with FIGS. 1 and 2.

In another exemplary embodiment, well suited for open network implementation, or for a combination of open and closed network implementations, the ICI system architecture 300 also includes one or more of the following additional components:

One or more additional EU_DPSs 336, utilized by respective one or more additional end-users 338 to access the documents of one or more document providers;

One or more additional DocP_DPSs 318, utilized by respective one or more additional document providers 324 to provide documents to various end-users, and to obtain content for IDINE(s) in their document(s) from one or more data providers;

One or more additional DatP_DPSs 322, utilized by respective one or more additional data providers 320 as additional data source(s) to provide data to various document providers for their documents and/or their IDINEs, or optionally directly to end-users interacting with certain types of IDINEs;

One or more data provider partner(s) 326, having one or more relationships with the data provider(s) 320, and possibly providing off-line, branded, or premium content thereto;

One or more IDINE provider data processing systems (IDINE_DPS) 328, utilized by one or more respective IDINE providers 330 as IDINE source(s) to enable document providers to add IDINEs to their documents whether by creating a custom IDINE, copying an existing IDINE for their user, or by modifying their own or a copy of another provider's IDINE for use in their document(s);

One or more IDINE component provider data processing systems (IC_DPS) 332, utilized by one or more respective IDINE component providers 334 as IDINE component source(s) to provide IDINE components to IDINE providers and/or to document providers for use in IDINEs; and One or more service provider data processing systems (SP_DPS) 340, utilized by respective one or more service providers 342, that may optionally provide necessary data processing services to other DPSs in the ICI system architecture 300, Any of the above additional ICI system architecture 300 components may communicate with one another (and/or with EU_DPS 302, DocP_DPS 306, or DatP_DPS 310) via one or more communication link(s) 316. A communication link 316 is preferably to any form of a communication connection between the various DPS components of the ICI system architecture 300, and that enables data transmission therebetween. Thus, the communication link(s) 316 may include one or more of the following, in any combination: direct telecommunication line(s), wireless broadband link(s) (e.g., satellite uplink, radio, cellular, wi-fi, etc.), and communication network(s) (such as a LAN (local area network), a WAN (wide area network), or the Internet).

As shown above, the ICI system architecture 300 is both flexible and scalable, in that it enables any number of end-users, document providers, data providers, IDINE providers, IDINE component providers, and other parties to structure a wide variety of technical and or/business relationships. For example, specific technical relationships may determine one or more of the following technical issues:

what party is generating an IDINE for a particular document;

how the content is delivered to any particular IDINE; and what party performs the necessary content preprocessing, etc.

For example, specific business relationships may determine one or more of the following business issues:

whether a document provider must pay an IDINE provider to generate an IDINE for their document;

whether a data provider charges for delivering data to the documents owned by a particular document provider (or, alternately, pays the document provider to include the data); and whether a document provider can easily duplicate a particular IDINE present in a document of another document provider for their own document, etc.

Figure 11H:
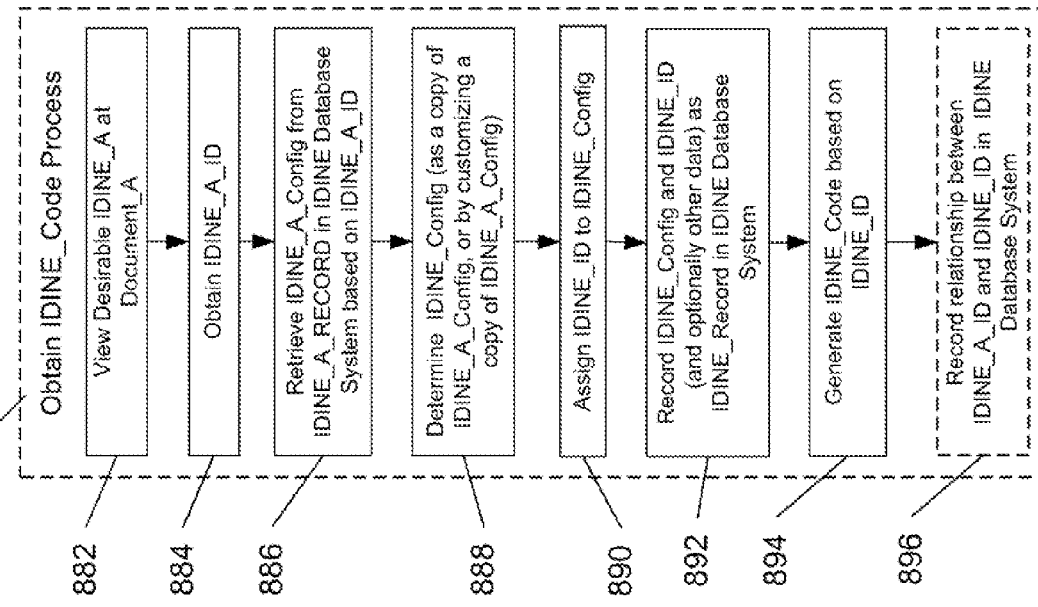
Figure 12B:
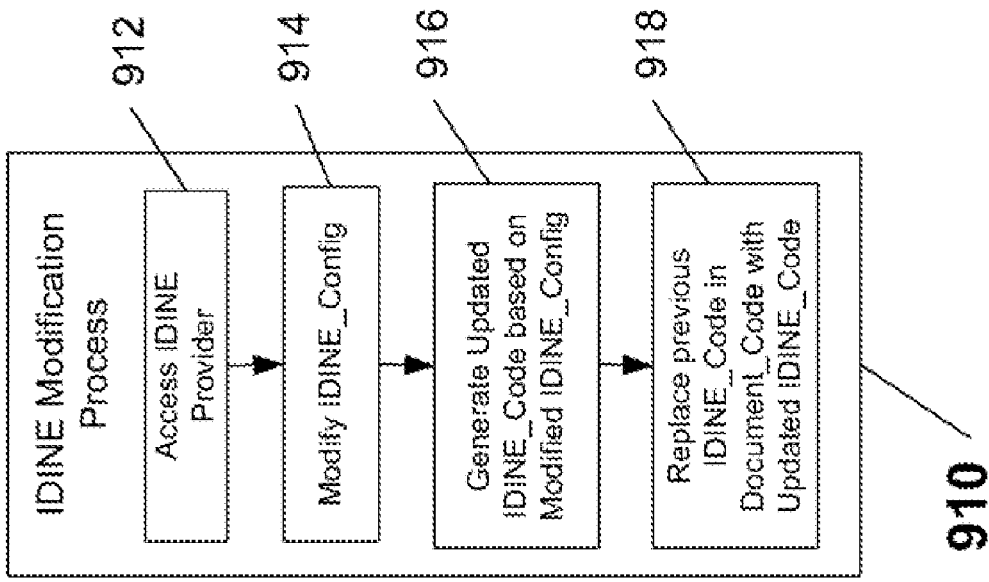
Figure 12A:
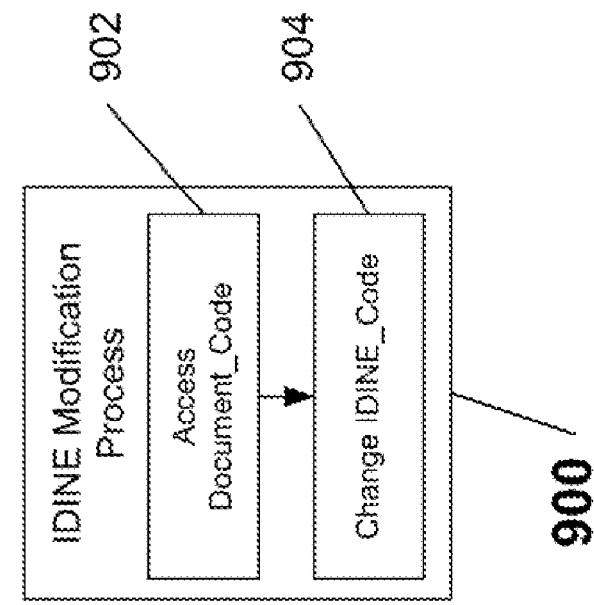
Figure 13:
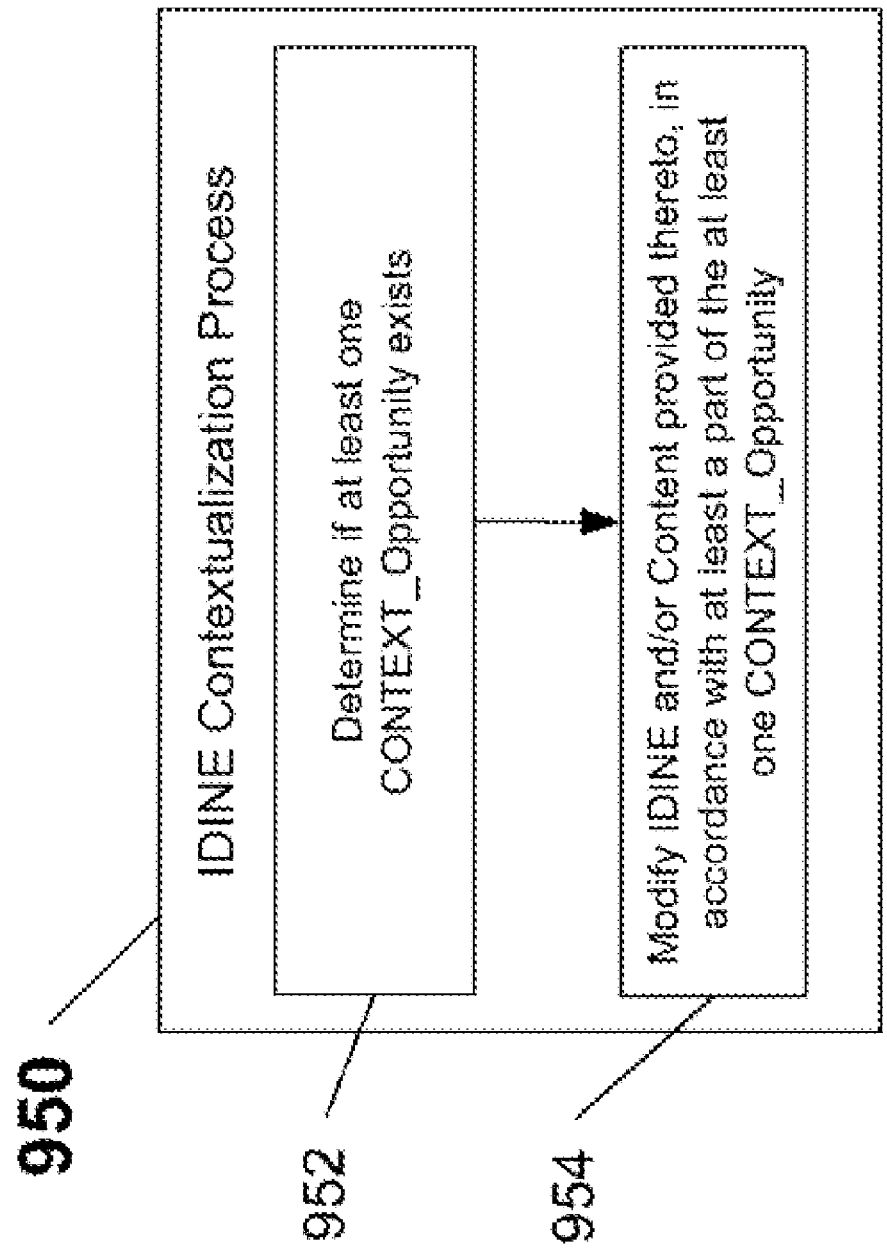
FIG. 13 shows a process flow diagram of an exemplary embodiment of a novel process selectively performed by the inventive system and method of FIG. 1 or of FIG. 10, for context-based automatic modification of an IDINE and/or for context-based modification data provided to an IDINE for interaction therewithin.

Advantageously, the various possible configurations of the ICI system architecture 300, may be readily used to implement and support any of the novel IDINE-related processes, such as various embodiments of the IDINE implementation process 800 of FIG. 11A, the IDINE modification processes 900 to 930 of FIGS. 12A to 12C, and the IDINE contextualization process 950 of FIG. 13. Similarly, the ICI system architecture 300 readily supports implementation of the various embodiments of ICI system operational infrastructures 150 (FIG. 4), 200 (FIG. 5), 400 (FIG. 7), 500 (FIG. 8), and 600 (FIG. 9).

Referring now to FIGS. 11A to 11H, there are many embodiments of novel techniques that may be used to enable a handling application to provide an IDINE in the DOC_Presentation of a document. Preferably, such techniques are advantageously implemented by making certain modifications to the Document_Code of the target document. It should also be noted the various steps disclosed in FIGS. 11A and 11C to 11H, may be readily interchangeable between the processes as a matter of design choice, without departing from the spirit of the invention.

In most embodiments of the present invention, the majority of the processes described below in connection with FIGS. 11A and 11C-11H (as well as FIGS. 12A-12C) are initiated by document providers in order to add one or more IDINEs to be provided within their documents' DOC_Presentation. Nevertheless, it should also be noted, that any of the steps in the processes of FIGS. 11A and 11C to 11H may be performed by any appropriate authorized party (end-user, document owner, content provider, etc.), individually, or jointly, manually and/or by utilizing various data processing resources at their disposal, for example, such as one or more of the DPSs 302, 306, 310, 318; 322; 328, 332, 336, and 340 of FIG. 6.

Reference should be made to Table 2, above, for definitions of certain terms used throughout FIGS. 11A to 11H. Additionally, the term "code" as used in connection with description of FIGS. 11A to 11H, refers to instructions that are compatible with (i.e., that may be placed into) the Document_Code.

FIG. 11A shows the preferred embodiment of IDINE implementation as an IDINE implementation process 800. The process 800 consists of three steps—at a first step 802, the IDINE_Code (see Table 2, definition #7) is obtained, at a second step 804, the IDINE_Code is inserted into the Document_Code of the target document, and at the third step 806, the handling application utilizes the IDINE_Code to provide the desired IDINE in the DOC_Presentation of the target document. The manner in which each of the steps 802-806 is performed to achieve the indicated result, depends on the specific embodiment of IDINE_Code utilized in conjunction with the process 800. Furthermore, various novel processes 830 to 880 that may be used in performing the step 802 (i.e., obtaining the IDINE_Code) are shown in FIGS. 11C to 11H.

Referring now to FIG. 11B, several exemplary embodiments of IDINE_Code are shown. A first embodiment of the IDINE_Code is shown as an IDINE_Code 810. The IDINE_Code 810 includes code representative of an IDINE_Config 812 that represents the desired IDINE configuration, and also includes an IDINE_IMP_Code 814, that, in conjunction with the IDINE_Config 812, provides all code necessary for the handling application to provide an IDINE of the desired configuration when the Document_Code with the IDINE_Code 810 is presented thereto. Because it includes the IDINE_IMP_Code 814, the instructions comprising the IDINE_Code 810 may make it sizeable and awkward to move or edit, but this arrangement has the advantage that the handling application does not need to perform any special actions other than to read and execute the provided IDINE_IMP_Code 814. For example, in the simplest implementation of process 800, where IDINE_Code 810 is used, at the step 802, the IDINE_Code 810 is written or copied from some source, at the step 804 it is "pasted" into the Document_Code, and at the step 806, the handling application executes the IDINE_IMP_Code 814, in conjunction with corresponding IDINE_Config 812, directly from the Document_Code to generate the desired IDINE. IDINE_Code 810 may be readily obtained utilizing any of the processes 830 (FIG. 11C), 840 (FIG. 11D), 850 (FIG. 11E), and/or 860 (FIG. 11F).

A second embodiment of the IDINE_Code is shown as an IDINE_Code 816. The IDINE_Code 816 includes code representative of an IDINE_Config 818 that represents the desired IDINE configuration, and also includes an IDINE_PRV_Code 820, that, in conjunction with the IDINE_Config 818, is capable of instructing one or more resources (e.g., IDINE provider, IDINE component provider, etc.) to generate the necessary IDINE_IMP_Code tailored to the supplied IDINE_Config, and provide it to the handing application for execution. For example, in one implementation of process 800 where IDINE_Code 816 is used, at the step 802, the IDINE_Code 816 is obtained (for example by receiving a link (i.e., IDINE_PRV_Code 820) to a specific IDINE source capable of generating IDINE_IMP_Code in response to IDINE_Config 818 provided thereto), at the step 804 the IDINE_Code 816 is inserted into the Document_Code (for example by the resource that was involved in obtaining it or through a "copy and paste" operation), and at the step 806, the handling application executes the IDINE_Code 816, causing the IDINE_PRV_Code 820 to instruct one or more resources (e.g., IDINE provider, IDINE component provider, etc.) to generate the necessary IDINE_IMP_Code based on the IDINE_Config 818 and provide it to the handing application for execution, to generate the desired IDINE. The IDINE_Code 816 may be easily obtained utilizing any of the processes 830 (FIG. 11C), 840 (FIG. 11D), 850 (FIG. 11E), and/or 860 (FIG. 11F).

A third embodiment of the IDINE_Code is shown as an IDINE_Code 822, which includes only an IDINE_PRV_Code 824, that is responsible for obtaining both an IDINE_Config to define the desired IDINE(s) and also responsible for arranging a resource (or resources) to generate IDINE_IMP_Code, based on the IDINE_Config, and to provide it to the handling application for execution. For example, in one implementation of process 800 where IDINE_Code 822 is used, at the step 802, the IDINE_Code 822 is obtained (for example by copying it, or by creating a link to a location of a previously determined IDINE_Config, as well as another link to a location of another IDINE_PRV_Code that is capable of instructing a specific resource to generate the necessary IDINE_IMP_Code based on the IDINE_Config and provide it to the handling application), and at the step 806, the handling application executes the IDINE_Code 822, causing the IDINE_PRV_Code 824 to retrieve the IDINE_Config, then retrieve the other IDINE_PRV_Code, that in turn transmits the IDINE_Config to the specific resource with instructions to return appropriate IDINE_IMP_Code to the handling application. The IDINE_Code 822 may be easily obtained utilizing any of the processes 840 (FIG. 11D), 850 (FIG. 11E), 860 (FIG. 11F), 870 (FIG. 11G), and/or 880 (FIG. 11H).

Referring now to FIG. 11C, a first exemplary embodiment of step 802 of FIG. 11A, is shown as an Obtain IDINE_Code process 830. At a step 832, the IDINE_Config, representative of a desirable IDINE, is determined by making the necessary choices about which specific settings, preferences, and other IDINE-related information would be present in the IDINE_Config. At a step 834, the appropriate IDINE_Code is generated, based on the IDINE_Config determined at the step 832.

The step 832 may be performed in many different ways. For example, the document provider may simply write code to manually determine the IDINE_Config, copy the IDINE_Config from another party, or utilize a tool to do so—for example, a form-based tool offered by an IDINE provider may be used to easily generate IDINE_Config by making certain selections in a form, and then (at the step 834) obtain the appropriate IDINE_Code for insertion into the Document_Code. The type of IDINE_Code generated at the step 834 may be selected as a matter of design choice. For example, it may be IDINE_Code 810, in which case the IDINE_IMP_Code 814, and the IDINE_Config 812, would be provided at the step 834, or it may be IDINE_Code 816, where at step 834, the IDINE_PRV_Code 820 and the IDINE_Config 818 are generated and placed into the IDINE_Code. Alternately, it may be IDINE_Code 822, where the IDINE_PRV_Code may include IDINE_Config by reference (e.g., via an IDINE_ID—see Table 3, definition #25, below).

Referring now to FIG. 11D, a second exemplary embodiment of step 802 of FIG. 11A, is shown as an Obtain IDINE_Code process 840 that is directed to enabling a party to advantageously duplicate a desirable IDINE seen in another document, assuming they have access to a copy of its Document_Code. After viewing, at a step 842, the desirable IDINE_A at a Document_A, at a step 844, the Document_A_Code (or, more likely, a copy thereof) is accessed, and at a step 846, the IDINE_A_Code, representative of the desirable IDINE_A, is copied from Document_A Code as IDINE_Code, which is then passed to the step 804 (FIG. 11A). The process 840 of FIG. 11D may be advantageously utilized with any embodiment of the IDINE_Code of FIG. 11B.

Referring now to FIG. 11E, a third exemplary embodiment of step 802 of FIG. 11A, is shown as an Obtain IDINE_Code process 850, that is directed to enabling a party to respond to an offer for implementing a particular IDINE in connection with their document. At a step 852, an offer for a particular IDINE may be viewed, for example in an electronic or physical document, or received (in any format whether by electronic message, telephone, mail, verbally etc.). At a step 854, the party may respond to the offer, and then be directed to another Obtain IDINE_Code process (such as shown in FIGS. 11C, 11D, and 11F to 11H), or, optionally simply receive directions for accessing a specific Obtain IDINE_Code process. The process 850 of FIG. 11E may be advantageously utilized with any embodiment of the IDINE_Code of FIG. 11B. In one example, the offer step 852 may be implemented in an IDINE, for example by providing a "copy this IDINE to anther document" link.

Referring now to FIG. 11F, a fourth exemplary embodiment of step 802 of FIG. 11A, is shown as an Obtain IDINE_Code process 860, that is directed to enabling a party to advantageously implement a desirable IDINE by first copying at least an IDINE_Config of a particular IDINE seen in another document (assuming the party has access to a copy of its Document_Code), and then utilizing it to create their own IDINE_Code.

After viewing, at a step 862, the desirable IDINE_A at Document_A, at a step 864, the IDINE_A_Code containing the IDINE_A_Config (or pointing to its location), or the IDINE_A_Config itself, is obtained, and at a step 866 an IDINE provider is accessed, such that the information copied from Document_A is delivered thereto. At an optional step 868, the IDINE_A_Config may be customized or changed to produce IDINE_Config. And, at step 870, IDINE_Code is generated based either on the original IDINE_A_Config, or on the IDINE_Config obtained at the optional step 868. The process 860 of FIG. 11F may be advantageously utilized with various embodiments of the IDINE_Code of FIG. 11D.

As noted in the above-described IDINE implementation process embodiments, placement of IDINE_Code 810 or 816 into the Document_Code, involves placement of IDINE_Config into the document. As a result, changing the IDINE_Config later, or copying it for another IDINE requires access to the Document_Code, and possibly "on-the-spot" editing. This issue becomes a particular challenge when a large number of IDINEs are involved (e.g., for a document provider with many documents supplied with IDINEs). Furthermore, it is very difficult to track if a particular IDINE_Code or IDINE_Config is copied. However, the IDINE_Code 822 of FIG. 11B disclosed that a single IDINE_PRV_Code 824 (that is responsible for implementing the desired IDINE), may be used to obtain the necessary information from one or more sources. Accordingly, in a number of exemplary embodiments of the present invention described below in connection with FIGS. 11G and 11H, FIG. 12C, and in FIGS. 7 and 8, a database approach is advantageously utilized to centralize IDINE_Config, and possibly other IDINE-related information, to enable easier access to, and modification of, IDINE_Config for various IDINEs, and to also enable definition and tracking of relationships between different IDINEs associated with the same or different documents, thus providing a wide range of additional inventive system functionality.

Before describing the various exemplary embodiments of IDINE implementation processes and operational system infrastructure, involving the use of an IDINE database, it would be useful to provide definitions of certain terms used in connection therewith. Referring to Table 3 below, under each listed term, information relating to the location and identification of the reference number of that term in the enclosed drawing figures is also provided.

Figure 11G:
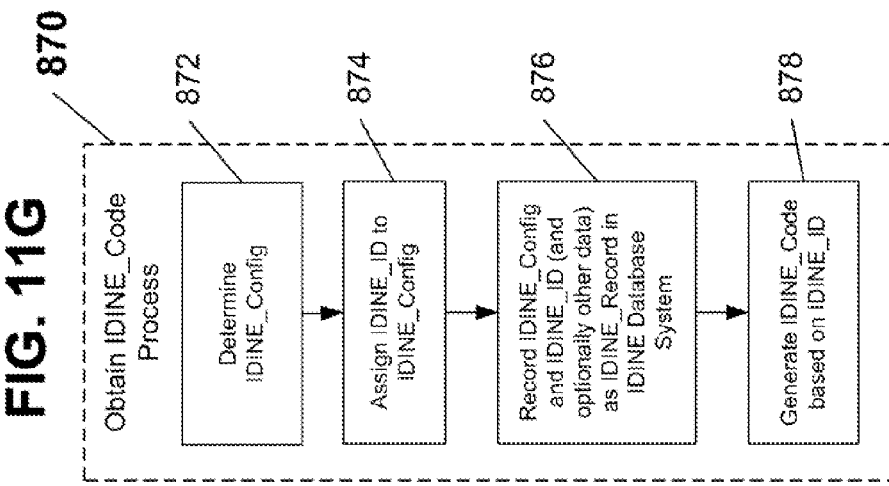

Referring now to FIG. 11G, a fifth exemplary embodiment of step 802 of FIG. 11A, is shown as an Obtain IDINE_Code process 870. After the IDINE_Config is determined or obtained at a step 872, through any of the approaches described above, at a step 874, an IDINE_ID is assigned to the IDINE_Config, and, at step 876, the IDINE_Config and the IDINE_ID are placed in an IDINE_RECORD, optionally along with additional information, in an IDINE database system. Then, at a step 878, the IDINE_Code is generated, for example including the IDINE_ID and other information, such as a IDINE_PRV_Code, and returned to step 804 of FIG. 1.

Referring now to FIG. 11H, a sixth exemplary embodiment of step 802 at FIG. 11A, is shown as an Obtain IDINE_Code process 880. After a desirable IDINE_A is viewed at Document_A at step 882, the IDINE_A_ID of the IDINE_A is obtained at step 884. At step 886, the IDINE_A_ID is presented to IDINE Database System, and the corresponding IDINE_A_Config is retrieved from the linked IDINE_A_RECORD. At a step 888, the IDINE_Config is determined by either making an exact copy of IDINE_A_Config, or by customizing a copy of IDINE_A_Config, and at a step 890 assigning an IDINE_ID to the IDINE_Config. At a step 892, the IDINE_Config and IDINE_ID (and optionally other data) are stored in an IDINE_RECORD in an IDINE Database System. Then, at a

TABLE 3

(Additional Definitions/Terminology)

Figure 7:
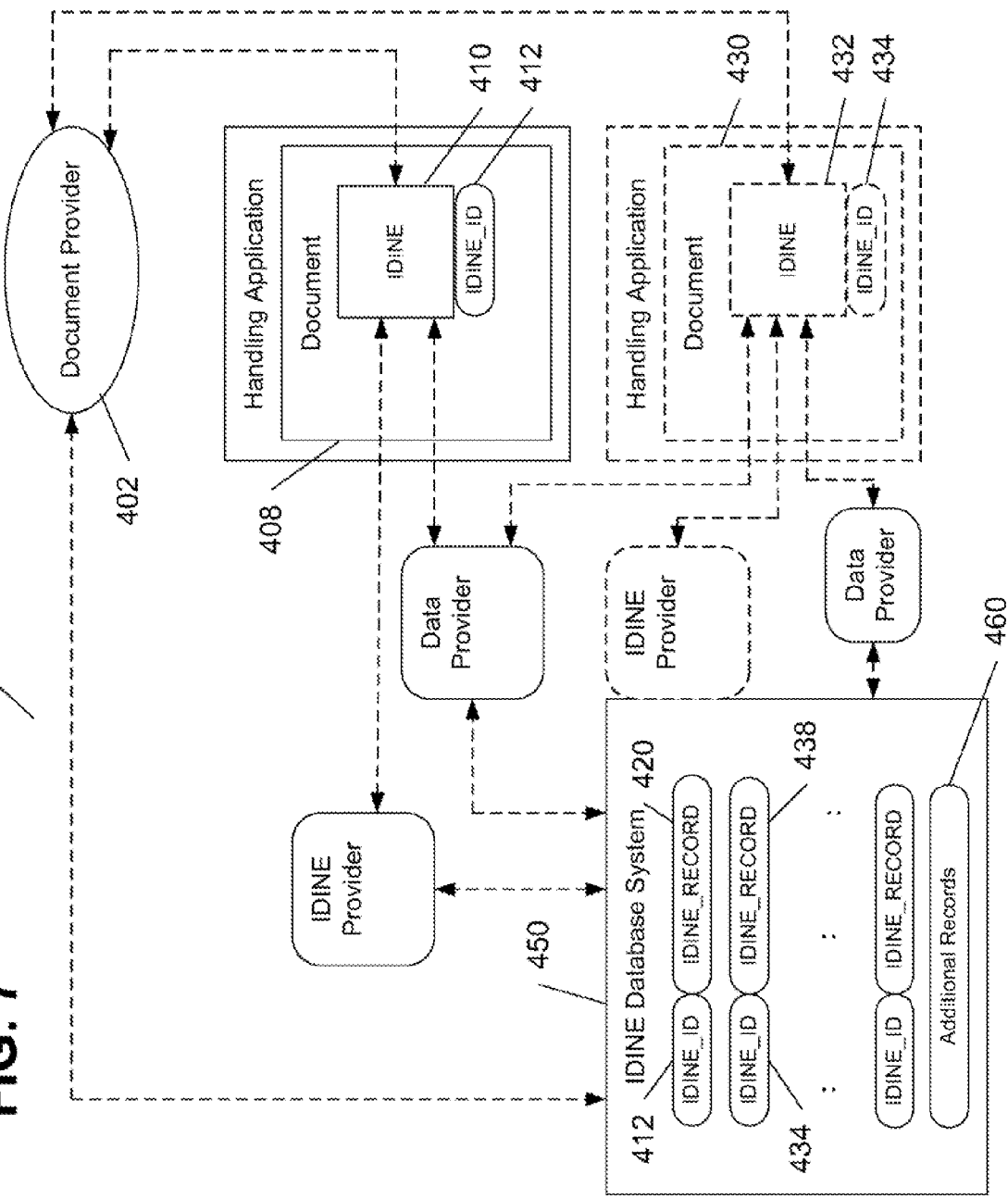
FIG. 7 shows a functional block diagram of a first database-driven exemplary embodiment of an operational infrastructure of the inventive system and method of FIG. 1
Figure 8:
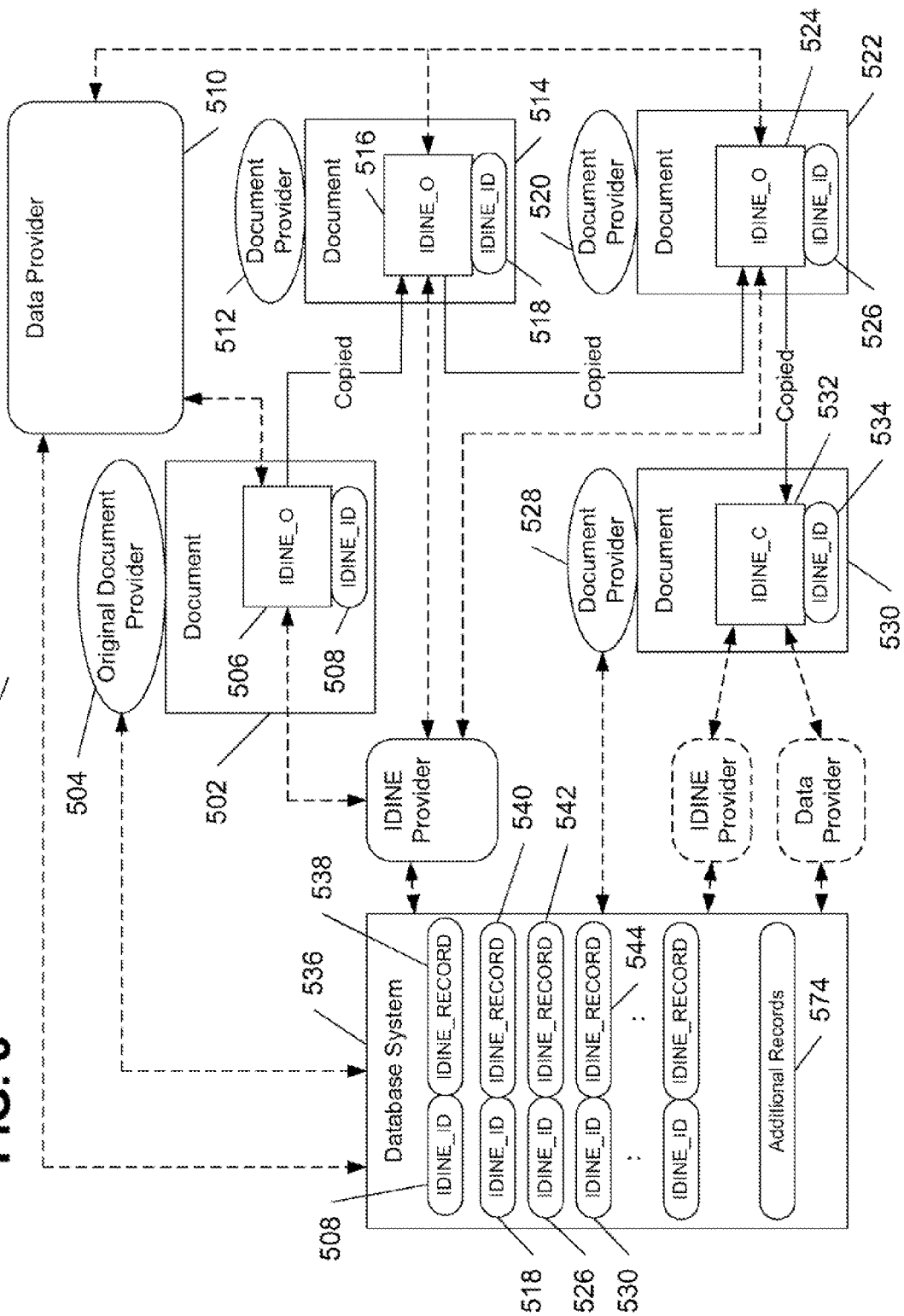
FIG. 8 shows a functional block diagram of a second database-driven exemplary embodiment of an operational infrastructure of the inventive system and method of FIG. 1.
Figure 9:
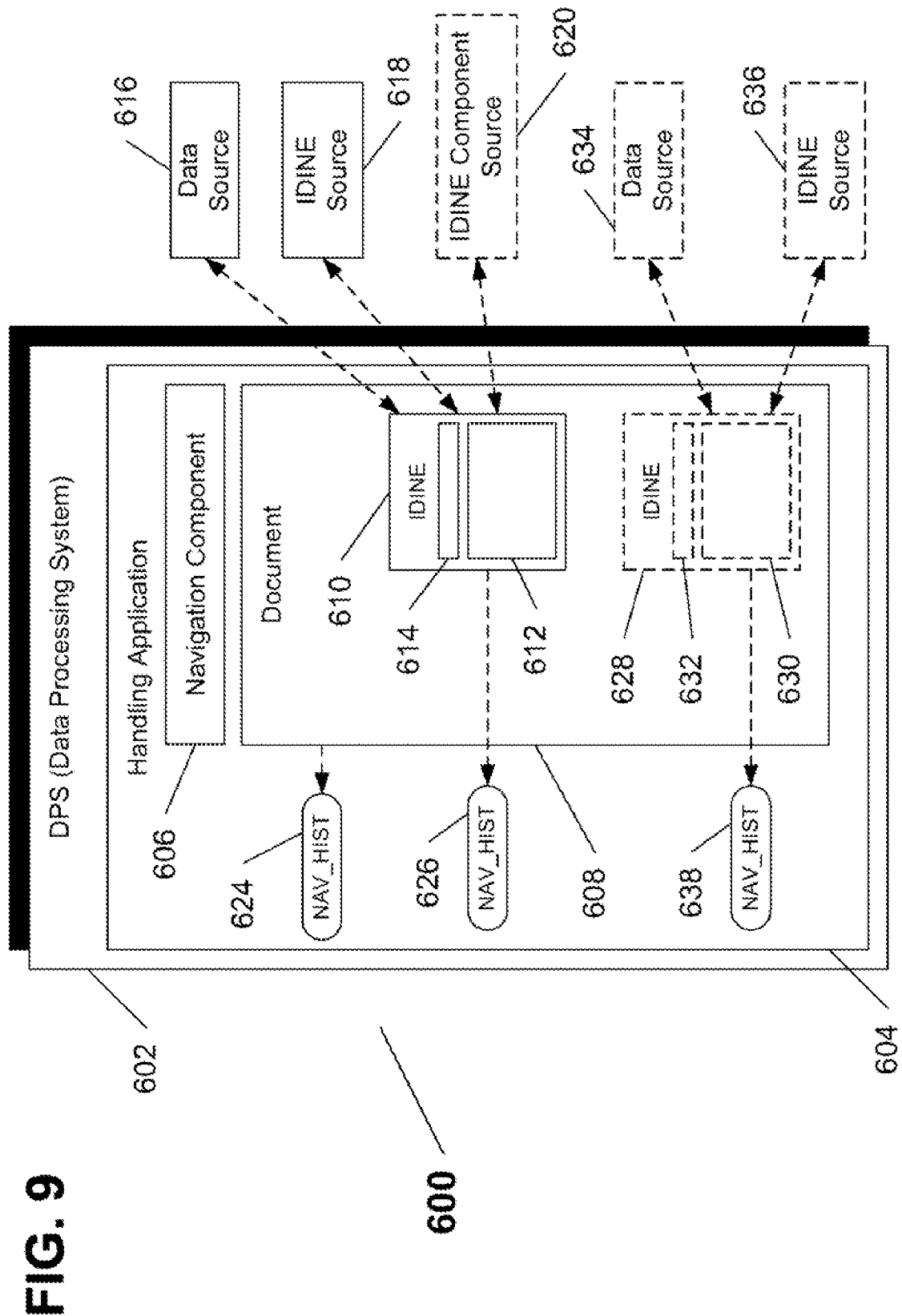
FIG. 9 a block diagram of a second exemplary embodiment of the inventive system and method for enabling at least one additional independent concurrent data navigation/interaction activity within the document.

| | | |
|---|---|---|
| 25 | IDINE_ID<br>FIG. 7 (412, 434, 440)<br>FIG. 8: (508, 518, 526, 534) | The term "IDINE_ID" is defined as a parameter assigned to represent a particular IDINE by uniquely identifying a combination of its IDINE_Config, its implementation details (i.e., the document where its IDINE_Code is located), and, optionally, identifying other related information. Advantageously, when the information identified by the IDINE_ID is stored in a database record associated with the IDINE_ID (see IDINE_RECORD and IDINE Database System definitions below), the IDINE_ID may be used to easily define and track relationships between different IDINEs associated with the same or with different documents, thus providing a wide range of additional inventive system functionality. Moreover, the IDINE_ID enables changes to a particular IDINE's IDINE_Config without having to make any additional changes to the IDINE_Code previously added to the Document_Code.<br>In addition, information that directs the handling application to transmit the IDINE_ID to an appropriate database where the relevant IDINE_RECORD associated with the IDINE_ID is located, may be integrated into the IDINE_ID or provided therewith. |
| 26 | IDINE_RECORD<br>FIG. 7 (420, 438, 442)<br>FIG. 8: (538, 540, 542, 544, 548) | The term "IDINE_RECORD" is defined as record in an IDINE Database System (see below) that stores a combination of: IDINE_Config, IDINE implementation details (i.e. the document where the IDINE is embedded), and, optionally, other IDINE-related information for an IDINE identified by a particular IDINE_ID associated with the record. |
| 27 | IDINE Database System<br>FIG. 7 (450)<br>FIG. 8: (536) | The term "IDINE Database System" is defined as an application residing on a data processing system of one of the parties, or on a separate data processing system, that contains one or more IDINE_IDs and corresponding associated IDINE_RECORDs, and that is capable of communication with other data processing systems in the inventive system infrastructure (and possibly with other IDINE Databases). | step 894, the IDINE_Code is generated, for example including the IDINE_ID and other information as a IDINE_PRV_Code, and returned to step 804 of FIG. 1. Optionally, at an optional step 896, the relationship between IDINE_A_ID and IDINE_ID is recorded in the IDINE Database System, or elsewhere. The process step 896 is advantageous because it enables wide-ranging IDINE-related activities, such as creating broadcast networks, where all IDINEs with a particular recorded relationship all receive broadcast content at once. Optionally, the relationships may be used to automatically propagate IDINE_Code changes, or for any other purpose.

Referring now to FIGS. 7 and 8, two exemplary embodiments of a database-driven ICI operational infrastructure are shown. It should be noted, that various components and elements of ICI system infrastructures 400 and 500, of FIG. 7 and FIG. 8, respectively, may readily correspond in their capabilities and descriptions to the similarly named components discussed above in connection with FIGS. 1, 2, and 5, and/or defined in Tables 1 to 3. Referring first to FIG. 7, the ICI system infrastructure 400 readily demonstrates an exemplary operation of IDINEs implemented through the process 870 of FIG. 11G. A document provider 402 previously participated in the process 870, to generate an IDINE 410, with a corresponding IDINE_Config having an IDINE_ID 412 assigned thereto, for their document 408. The IDINE_ID 412 is stored in an IDINE_RECORD 420 in an IDINE database system 450. The IDINE database system 450 may include other IDINE_RECORDs, or other additional records 460.

Optionally, the document provider 402 may create an additional document 430 and provide it with an IDINE 432 that is identical to the IDINE 410 (and thus likely has an identical IDINE_Config, but a different IDINE_ID 434 and IDINE_RECORD 438 because it is located in a different document 430). Because the IDINEs 410, 432 are related, the IDINE database system 450 can keep track of their relationships.

Thus, in the ICI system infrastructure 400, if the document owner 402 wants to easily change one or both of their IDINEs 410, 432, (for example, as discussed in connection with FIG. 12C, below), they simply access the IDINE database system 450, and by proving at least one of the IDINE_IDs 412, 434, and changing the appropriate IDINE_Config, automatically propagate the modifications to one or both IDINEs 410, 432.

Referring now to FIG. 8, the ICI system infrastructure 500 readily demonstrates an exemplary operation of IDINEs implemented through the process 880 of FIG. 11H. An original document provider 504 previously participated in the process 870 or 880, to generate an original IDINE_O 506, with a corresponding IDINE_Config having an IDINE_ID 508 assigned thereto, for their document 502. The IDINE_ID 508 is stored in a IDINE_RECORD 538 in a IDINE database system 536. The IDINE database system 536 may include other IDINE_RECORDs, or other additional records 574.

A document provider 512 previously used the process 880 of FIG. 11H to copy the IDINE_O 506 as an identical IDINE_O 516 into their document 514, and received a corresponding IDINE_ID 518 from the IDINE database system 536, linked to the IDINE_ID 508. Similarly, a document provider 520 previously used the process 880 o FIG. 11H, to copy the IDINE_O 516 as an identical IDINE_O 524 into their document 522, and received a corresponding IDINE_ID 526 from the IDINE database system 536, linked to the IDINE_ID 516. However, a document provider 528 previously used the process 880 of FIG. 11H, to copy the IDINE_O 524, but then, at the step 888 of the process 880, customized the obtained IDINE_Config to later receive IDINE_C 532 for their document 530, and received a corresponding IDINE_ID 534 from the IDINE database system 536, linked to the IDINE_ID 26.

Thus, while the effort was made to generate only a single original IDINE_O 506, three additional IDINEs were very easy to create therefrom, which facilitates the attractiveness, dispersion and popularity of IDINEs. Furthermore, just as described in connection with the ICI system infrastructure 400 of FIG. 7, the ICI system infrastructure 500 may be readily utilized for IDINE broadcast network implementations that, for example, may include rules governing how IDINE_ID relationships affect the participation in network events. Thus, for example because the IDINE_C 532 has been changed, it may not be eligible for certain activities.

Additionally, access to the database system 536 may be opened to more parties (end-users, data providers, etc.) than just the document providers. In this case, the use of rules that control the hierarchy of access to, and rights to modify, contents of IDINE_RECORDs, may be quite advantageous. As noted above, these rules may be organized and implemented as a modification permission protocol that governs the rights of each party (i.e., end-user, document provider, IDINE provider and data provider) to create, configure, and modify an IDINE (e.g. by accessing IDINE_Config in IDINE_RECORDs or by other means). The participation in, and control over, composition, and scope of a particular modification permission protocol may be as simple or as complex as desired by the party or parties responsible for defining and/or administering it.

Referring now to FIGS. 12A to 12C, various embodiments of inventive IDINE modification processes are shown. As can be readily seen, the IDINE modification processes 900, 910 and 930, are similar to, and in some way are extensions of, the IDINE implementation—related processes of FIGS. 11A to 11H. Accordingly, in addition to the modification techniques described below, any of the IDINE implementation—related processes of FIGS. 11A to 11H may be readily adapted for IDINE modification.

Referring first to FIG. 12A, an exemplary IDINE modification process 900 is shown, which simply involves accessing the Document_Code at a step 902, and then making appropriate modifications to the IDINE_Code therein at a step 904. For example, step 904 may involve manually editing the IDINE_Code (e.g., the IDINE_Config, and/or the IDINE_IMP_Code, if present).

Referring now to FIG. 12B, an exemplary IDINE modification process 910 is shown, which involves accessing an IDINE provider at a step 912, then making appropriate modifications to the IDINE_Config at a step 914, either directly, or, for example, interactively through a graphical user interface, such as form tool, if offered by the IDINE provider. At a step 916, an updated IDINE_Code, based on modified IDINE_Config, is generated, and, at a step 918, the previous IDINE_Code in a Document_Code is replaced with the updated IDINE_Code, thus implementing the desired IDINE changes.

Referring now to FIG. 12C, an exemplary database-driven IDINE modification process 930 is shown (which may be readily implemented using the ICI infrastructures 400 and/or 500 of FIGS. 7 and 8, respectively). At a step 932, the IDINE database system is accessed, for example by logging in after identity verification. At a step 934, an IDINE_ID of the IDINE to be modified is presented to the IDINE database system, so that the appropriate IDINE_RECORD, containing the IDINE_Config, is retrieved. At an optional step 936, the extent of the rights of the party to actually modify the IDINE_Config (as opposed to requesting certain modifications), may be verified, for example in accordance with a particular modification permission protocol, At a step 938, the IDINE_Config is modified (or request to modify noted), and at a step 940, the appropriate IDINE_RECORD is updated with the IDINE_Config (or with the modification request).

Depending on which techniques (discussed above in connection with FIGS. 11A to 11H) are utilized to implement one or more IDINEs in various embodiments of the above-described ICI systems, additional significant benefits may be realized by enabling selective context-based modifications to IDINEs and/or the content delivered to them, based on certain criteria.

Referring now to FIG. 13, an exemplary embodiment of a novel IDINE contextualization process 950 is shown. The novel contextualization process 950, may be initiated by, and/or performed on behalf of, one or more appropriate parties (end-user, document owner, content provider, etc.), utilizing one or more various data processing resources at their disposal, for example, such as one or more of the DPSs 302, 306, 310, 318, 322, 328, 332, 336, and 340 of FIG. 6.

At a step 952, the contextualization process 950 first determines if one or more predetermined opportunities for contextualization (CONTEXT_Opportunities) exist, and if so, at a step 954, the process 950 modifies the IDINE, and/or the content provided thereto, in accordance with at least a portion of the at least one CONTEXT_Opportunity determined at the step 952. As a result, the context-based customization provided by the process 950, may greatly improve the end-user IDINE utilization experience, and/or benefit one or more of the other parties (data provider, etc.).

Modification of the IDINE can be implemented using any of the IDINE modification processes discussed above in connection with FIGS. 12A to 12C, or in a different manner (for example, directly by the handling application). Content may be readily modified (changed, replaced, reformatted, etc.) by the content provider or by another party that has access to the content and the capability to make the modifications. As an example, process 950 can enable an IDINE to automatically receive an enhanced IDINE component that is supported by a new feature in the handling application. In another example, the process 950 can cause the content delivered to the IDINE to be reformatted if the handling application does not provide support for that content type or format (and thus does not permit the IDINE to do so).

A CONTEXT_Opportunity is defined as one or more prospects for changing the IDINE or content delivered thereto, in a manner beneficial to at least one party (end-user, document provider, IDINE provider, data provider, etc.), based on certain information received in a particular context. Thus, in one exemplary CONTEXT_Opportunity, for context information relating to the end-user's zip code, and movie-related content being delivered to the IDINE, the prospects may include providing the end-user with content tailored to his location (e.g., local showtimes) and/or modifying the IDINE to include a control for purchasing local tickets.

Advantageously, CONTEXT_Opportunities may relate to virtually any item of information, an event, a feature of an application or a DPS, a particular activity or lack thereof, and so on. For example, CONTEXT_Opportunities may relate, but are not limited to, one or more of the following:

1. Application/Environment/DPS functionality (and/or configuration): The term "functionality" represents the features, capabilities, and limitations of the Application/Environment/DPS, while the term "configuration" refers to the current settings and preferences thereof;
2. End-user data: e.g., one or more data items representative of information related to the end-user, to the end-user's environment, and/or to the end-user's past activities. Thus, end-user data may include, but is not limited to: the end-user's preferences, end-user's personal information (birthday or other important dates, observed holidays, etc.), Internet browsing history, past purchasing history, the end-user's geographic location and time zone, as well as any other information provided by the end-user, and/or collected about the end-user;
3. Content delivered to the IDINE: the content itself can provide a CONTEXT_Opportunity for change, for example, adding a necessary control component to the IDINE; and
4. Document-related information, such as content present in the document that contains the IDINE, may serve as a CONTEXT_Opportunity, for example by causing the IDINE to receive new content having synergy with the document content.

Specifically, one of the most useful applications of the process 950 is providing contextualized advertising content to the IDINE (as the main source of content, or in addition to the main content). Thus, any of the above CONTEXT_Opportunities may be readily utilized to implement advertising content, promotional activities and offers, or other marketing services, through contextual customization of the IDINE and/or content delivered thereto.

Other advantageous implementations of the contextualization process 950 may be provided as a matter of design choice or convenience. For example, the process 950 may be a premium service offered by the IDINE provider.

Referring now to FIG. 9, a second exemplary embodiment of the inventive system and method for enabling at least one additional independent concurrent data navigation/interaction activity within the document is shown as an inventive independent content interaction (ICI) system 600.

As discussed above, various inventive embodiments of the present invention provide end-users with the ability to navigate content provided to an IDIE in the DOC_Presentation of their document, without navigating way from the document. Typically, navigation is enabled by handling applications by keeping track of "history" of navigation activities, which is used by the application when navigation commands are received from the user. However, this approach may pose a challenge because the inventive IDINE provides controls for content navigation that are independent from the navigation controls of the handling application, and in some implementations are dependent on the handling application for tracking history.

Accordingly, the ICI system 600 provides a solution to the above challenge by enabling separate and individual tracking of navigation history of the handling application, and of each IDINE provided to a document's DOC_Presentation.

By way of example, various components and elements of ICI system 600 may readily correspond, in their capabilities and descriptions, to the similarly named components discussed above in connection with FIGS. 1, 2, and 5. Thus, for example:

The DPS 602, the handling application 604, the document 608, the IDINEs 610 (and optional IDIE 628), may correspond, respectively, to the DPS 12, the handling application 14, the document 22, and the IDINEs 24a, 24b of FIG. 1, The data source 616 (and optional data source 634), the IDINE source 618 (and optional IDINE source 636), and the IDINE component source 620, may correspond, respectively, to the data source 210, the IDINE source 212, and the IDINE component source 216 of FIG. 5; and The data display/interaction component 612 (and optional component 630) of IDIEs 610, 628, may correspond to the data display/interaction component 30 of FIG. 2.

The handling application 604 is provided with a navigation component 606 that enables the user to navigate within the document 608, and also between document 608 and other documents. Similarly, the IDIE 610 is provided with an IDIE navigation control 614 (and an optional IDIE 628 is provided with an IDIE navigation control 632). Preferably, the DPS 602 individually tracks navigation (and optionally interaction) activities that involve the handling application 604 and the IDINE 610 (and optionally the IDINE 628) in separate records—NAV_HIST 624 for the handling application 604, and NAV_HIST 626 for the IDINE_610 (and optionally NAV_HIST 638 for the optional IDINE 628). The separate NAV_HIST 624, 626, and 638, may then be advantageously utilized by the DPS 602 for various purposes—for example, to ensure that navigating content in the IDINE 610 does not affect navigation of content in the optional IDINE 628.

Figure 10:
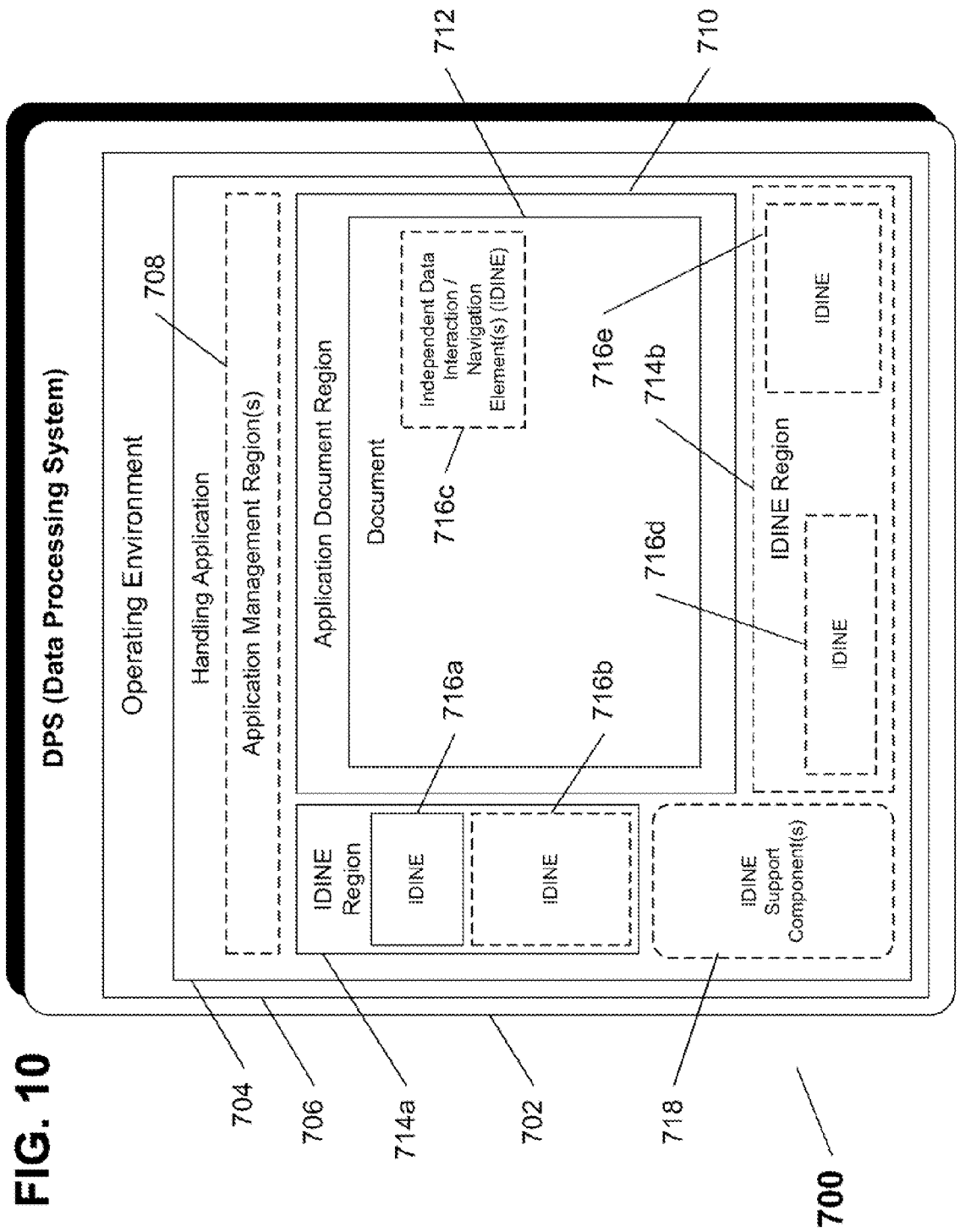
FIG. 10 shows a block diagram of a third exemplary embodiment of the inventive system and method for enabling at least one additional independent concurrent data interaction/navigation within the application.

Referring now to FIG. 10, a third exemplary embodiment of the inventive system and method for enabling at least one additional independent concurrent data navigation/interaction activity within the document is shown as an inventive independent content interaction (ICI) system 700.

One significant advantage of the inventive system and method is the fact that the novel IDINE and related functionality may be readily implemented simply by making modifications to the Document_Code of a document without modifying the handling application. However, as noted above, and as demonstrated by way of example below in connection with description of the ICI system 700, the inventive system and method may be readily adapted to provide one or more IDINEs in the handling application, rather than in the DOC_Presentation of a document.

By way of example, unless otherwise indicated, various components and elements of ICI system 700 may readily correspond in their capabilities and descriptions to the similarly named components discussed above in connection with FIG. 1. Thus, for example:

The DPS 702, the handling application 704, the operating environment 706, the application management region 708, the application document region 710, and the document 712, may correspond, respectively, to the DPS 12, the handling application 14, the operating environment 16, the application management region 18, the application document region 20, and the document 22, of FIG. 1.

In principle, the ICI system 700 may behave and operate similarly to the ICI system 10 of FIG. 1, in that it can support implementation of IDINEs (e.g., optional IDINE 716c, corresponding to the IDINE 24a of FIG. 1) based solely on addition of an IDINE_Code to Document_Code of the document 712, without requiring modification of the handling application 704.

However, preferably, the handling application 704 can also include an IDINE region 714a that may be positioned anywhere in its user interface portion and configured for implementing one or more IDINEs (e.g., IDINE 716a, 716b, etc.) therein. Thus, for example, rather than changing the Document_Code, implementation of the IDINE 716a is accomplished by changing the handling application 704 to include an IDINE region 714a, and to place the IDINE 716a therein. Optionally, the handling application 704 may include one or more additional IDINE regions 714b, that in turn may include optional IDINEs 716d, 716e provided therein.

In an alternate embodiment of the present invention, rather than (or in addition to) being modified to enable provision of IDINEs outside the DOC_Presentation of the document 712, the handling application 704 may include at least one IDINE support component 718, that enables the handling application 704 to support additional functionality for both application-based and document-based IDINEs, that would otherwise be unavailable. For example, to enable secure login through the IDINE 716c, the handling application 704 may require an IDINE support component 718 capable of authenticating the IDINE 716c.

It should be noted, that in enabling one or more IDINEs to be provided within a document (i.e., in its DOC_Presentation) the system and method of the present invention enables a wide variety of possible advantageous IDINE-related applications, where the presence and use of IDINEs creates unique benefits and/or synergy with other beneficial technological offerings. In addition, alternate embodiments of IDINEs, and IDINE-related infrastructure, ran be readily created based on one or more of the exemplary embodiments presented herein. Such IDINE-related applications and alternate IDINE embodiments may include, but are not limited to, one or more of the following, all of which are contemplated and encompassed by the system and method of the present invention:

Use of advertising content within an IDINE, displayed as content, along with content in the data display/interaction component, or in any other IDINE component;

A compensation system, involving at least two parties, selected from IDINE providers, document providers, content providers, and/or end-users, that enables one or more of the involved parties to be compensated for one or more activities related to creating, implementing, providing, supporting, and/or using IDINEs;

Various IDINE features to support the compensation system: such as adding a time-based non-payment IDINE expiration property, tracking the source of a copied IDINE to ensure that a premium (e.g., "paid-for") IDINE is not being freely used by a non-paying document provider, techniques for IDINE authentication to prevent spoofing of secure logins or payment interfaces, therein; providing premium IDINE features for purchasers (e.g., premium content, no advertising, etc.); and IDINE and/or content utilization monitoring for enhanced research and marketing data collection capabilities.

In addition, the inventive IDINE and related infrastructures, are an ideal match for utilization as part of configurable workspaces that may be provided for use in conjunction with documents, handling applications, and/or operating environments. Workspaces may be implemented in a manner similar to the database-driven IDINE embodiments, except that a workspace may contain one or more IDINEs as well as other objects, tools, widgets, or other forms of content or controls.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method for enabling a user of an interactive data processing application, comprising at least one application feature and at least one application setting, to engage in a first content interaction activity, within a content structure presented by the application to the user, and to contemporaneously engage in at least one content navigation activity, within at least one of the application and the content structure, independently of the first content interaction activity, comprising the steps of:
   (a) defining at least one independent content navigation interface, in addition to, and independent from, the at least one application feature of the application and having at least one interface setting independent from the at least one application setting, within at least one of: an application content presentation region occupied by the content structure, and an application region outside said application content presentation region, but within a region defined by said interactive data processing application;
   (b) generating, in said at least one independent content navigation interface, at least one content interaction region for interaction therewith by the user;
   (c) presenting, to the user, at least one of a plurality of discrete content elements within said at least one content interaction region, for selective navigation therethrough by the user in a user-determined sequence;
   (d) generating, in said at least one independent content navigation interface, and proximal to said at least one content interaction region, at least one proximal content navigation control selectively operable, when presented with a plurality of discrete content elements within said at least one content interaction region, to enable selective navigation between said plural discrete content elements within said at least one content interaction region in said user-determined sequence, without interfering with the first content interaction activity, and without affecting the displayed portion of the content structure;
   (e) in response to utilization, by the user, of said at least one independent content navigation interface to navigate between at least a portion of the plural discrete content elements, generating a historical record of at least one previously viewed discreet content element and of a navigation sequence therethrough; and
   (f) enabling the user to utilize said at least one independent content navigation interface to navigate backward, only to said plural discrete content elements recorded in said historical record.

2. The method of claim 1, further comprising the steps of:
   (d) selectively providing content to the content structure, for interaction therewith during the first content interaction activity; and
   (e) selectively providing at least one of said plural discrete content elements to said at least one independent content navigation interface, during the at least one content navigation activity, in response to interaction by the user with at least one of: said at least one content interaction region, and said at least one proximal content navigation control, and when necessary, selectively subjecting said at least one of said plural discrete content elements to at least one content transformation process, prior to provision thereof to said at least one independent content navigation interface.

3. The method of claim 1, wherein the at least one content navigation activity further comprises at least one additional content interaction activity, and, wherein said content in the content structure comprises at least one of said plural discrete content elements.

4. The method of claim 1, wherein said at least one content navigation control comprises: a first control operable by the user to selectively navigate backward through said plural discrete content elements, and a second control operable by the user to selectively navigate forward through said plural discrete content elements.

5. The method of claim 1, wherein said at least one independent content navigation interface comprises a plurality of components, said plural components at least comprising: said at least one content interaction region, and said at least one proximal content navigation control, and wherein said at least one independent content navigation interface further comprises a plurality of characteristics selected from a group of: shape, size, position, visual appearance, functionality, behavior, status, category, identifier, authorship, security, lifetime, duplicability, modifiability, restrictions on modification of at least one of said plural characteristics, navigation history, starting location of an initial content element of said plural content elements, information representative of a location of at least a portion of said plural content elements, at least one relationship with at least one other independent content navigation interface operable for utilization by at least one of: the user and at least one third party, and at least one of size, shape, relative position to said at least one other independent content navigation interface, selection of specific additional or replacement plural components of said independent content navigation interface, and at least one contextualization function operable to modify, in accordance with at least one predetermined contextualization rule, at least one of:
   at least one of said plural characteristics,
   at least one of said plural discrete content elements,
   operation of said at least one content navigation control, and
   operation of said at least one content interaction region.

6. The method of claim 5, further comprising the step of:
   (f) prior to said step (a), selectively designating, by a first authorized party, a specific value for each definable plural characteristic of at least a portion of said plural characteristics, such that said step (a) is performed in accordance with said defined plural specific values, and wherein each characteristic of at least a portion of said plural characteristics, comprises predetermined default values,
   wherein when said plural characteristics comprise at least one modifiable plural characteristic, the method of claim 5, further comprises the step of:
   (g) selectively modifying, by at least one of: changing, and configuring, by a second authorized party, at least one value of at least one corresponding modifiable plural characteristic,
   and wherein each of at least one of: said first authorized party and said second authorized party, comprises at least one of: the user, a content structure provider, an interactive data processing application provider, an independent content navigation interface provider, an independent content navigation interface component provider, and a content provider that provides at least a portion of said plural discrete content elements.

7. The method of claim 6, further comprising the steps of:
(h) prior to said step (g), selectively designating, by at least one predetermined first authorized party, at least one specific characteristic of said plural characteristics, as said at least one modifiable plural characteristic; and
(i) selectively defining said second authorized party as comprising at least one of: the user, said content structure provider, said interactive data processing application provider, said independent content navigation interface provider, said independent content navigation interface component provider, and said content provider that provides at least a portion of said plural discrete content elements.

8. The method of claim 7, further comprising the step of:
(j) selectively modifying said at least one independent content navigation interface in accordance with a predetermined component alteration procedure, said selective modification procedure comprising at least one of: removing at least one said plural component from said at least one independent content navigation interface, or providing at least one additional component to said at least one independent content navigation interface, each said at least one additional component having at least one characteristic with a corresponding value that improves the user's at least one content navigation activity experience, by at least one of: providing at least one new function to said at least one independent content navigation interface, improving the ergonomic qualities of said at least one independent content navigation interface, providing access to at least one additional discrete content element, improving the appearance of said at least one independent content navigation interface, and enabling the user to modify at least one value of at least one previously unmodifiable plural characteristic.

9. The method of claim 8, wherein each at least one of said steps (a) to (j), is performed by a provider party, each comprising at least one of: said content structure provider, said interactive data processing application provider, said independent content navigation interface provider, said independent content navigation interface component provider, said content provider that provides at least a portion of said plural discrete content elements, a premium discrete content element provider, and a service provider, further comprising the steps of:
(k) establishing and maintaining a first compensation arrangement between a using party and at least one said provider party, and/or selectively establishing and maintaining a second compensation arrangement between different provider parties, in consideration for at least one of: provision of said at least one independent content navigation interface, continued utilization of said at least one independent content navigation interface, enhancement of said at least one independent content navigation interface in accordance with said step (j), access to at least one premium plural discrete content element, addition of advertising content to at least one of: at least one said plural discrete content element and at least one plural component of said at least one independent content navigation interface capable of exposing said using party to advertising, and removal of advertising content from said independent content navigation interface.

10. The method of claim 9, wherein said using party and said provider party each comprise at least one of: the user, said content structure provider, said content structure provider, said interactive data processing application provider, said independent content navigation interface provider, said independent content navigation interface component provider, said content provider that provides at least a portion of said plural discrete content elements, a premium discrete content element provider, and a service provider.

11. The method of claim 10, further comprising the steps of:
(l) selectively adding advertising content, received from at least one of: an advertising party and a brand partner, to at least one of: at least one said plural discrete content element, or at least one said plural component of said at least one independent content navigation interface capable of exposing said using party to advertising,
(m) in consideration of performance of said step (l) by said provider party, selectively establishing and maintaining a third compensation arrangement between said provider party and at least one of: said advertising party and a brand partner party and at least one said provider party;
(n) selectively removing advertising content, received from at least one of: an advertising party and a brand partner, from at least one of: at least one said plural discrete content element, or at least one advertising exposure plural component of said at least one independent content navigation interface, and
(o) in consideration of performance of said step (n) by said provider party, selectively establishing and maintaining a fourth compensation arrangement between said provider party and said using party.

12. The method of claim 10, further comprising the step of:
(p) generating, in said at least one independent content navigation interface, a secure compensation component, comprising a payment control operable to selectively:
enable said using party to satisfy at least one predetermined compensation arrangement with said provider party; and
enable said using party to make an electronic payment, to another party, for at least one of goods or services purchased therefrom.

13. The method of claim 5, further comprising the step of:
(q) generating, in said at least one independent content navigation interface, at least one component selected from a group of:
at least one control operable to selectively modify at least a portion of said plural characteristics;
a first control operable to display at least a portion of current values of said plural characteristics;
a second control operable to save at least a portion of current values of said plural characteristics;
a third control operable to display at least a portion of said plural discrete content elements in a hierarchical navigable directory format;
a fourth control operable to enable the user to enter a location from which at least a portion of said plural discrete content elements may be retrieved for interaction therewith in said at least one content interaction region;
a fifth control operable to enable the user to search for at least one plural discrete content element;

a sixth control operable to provide secure access to at least a portion of said plural discrete content elements;

a seventh control operable to enable the user to directly return to a first plural discrete content element presented at said step (c) to the user;

an eighth control operable to generate a new at least one independent content navigation interface;

a ninth control operable to generate a copy of said at least one independent content navigation interface as an additional independent content navigation interface such that the user may utilize said additional independent content navigation interface to engage in at least one additional content navigation activity, independently of both the first content interaction activity, and of the least one content navigation activity, wherein said additional independent content navigation interface is positioned in one of: within the content structure, within an application region positioned outside said application content presentation region, or outside of both said application content presentation region and said content structure;

a tenth control operable to enable secure verification of the identity of the user; and at least one display region for displaying to the user at least one information item selected from a group of: status of said at least one independent content navigation interface, identification of said at least one independent content navigation interface, identification of a plural discrete content element currently presented in said at least one content interaction region, information relating to said currently displayed plural content element, information relating to at least one other content element, identification of the content structure, promotional content, advertising content, a logo, a static decorative graphical element, and a dynamic decorative graphical element;

a contextualization detector operable to determine whether a opportunity exists to automatically modify at least one of said plural characteristics of said independent content navigation interface, in response to detection of at least one predetermined contextualization opportunity based on information related to at least one of the following: the user, the user's environment, content in at least one of said plural discrete content elements being interacted therewith by the user, the interactive data processing application, the content structure, at least one predetermined first content interaction activity, or at least one predetermined content navigation activity; and a contextualization control, responsive to said contextualization detector, operable to selectively or automatically modify at least one value of at least one plural characteristic of said at least one independent content navigation interface having a predetermined relationship with a detected context opportunity.

14. The method of claim 5, wherein the interactive data processing application comprises an application functionality representative of plural application functions for interacting with at least one of a plurality of content structures, and wherein the content structure comprises plural content presentation parameters representative of the particular manner in which the interactive data processing application presents content in the content structure to the user, and also comprises a content structure code that provides instructions representative of said plural content presentation parameters to the interactive data processing application, and that determines at least one particular application function selected from said plural application functions, made available to the user for selective utilization thereof during the first content interaction activity.

15. The method of claim 14, wherein said at least one independent content navigation interface comprises a navigation interface code representative of at least one modification to at least one of: said content structure code of the content structure and said application functionality of the interactive data processing application, that, when implemented, causes the interactive data processing application to provide said at least one independent content navigation interface having desired functionality, usability, appearance, configurability, and usefulness, and capable of a desired scope of user-accessible content navigation interaction activities.

16. The method of claim 15, wherein said navigation interface code comprises at least one of:

interface configuration data representative of at least a portion of specific desirable values of said plural characteristics applicable to each particular desired independent content navigation interface of said at least one independent content navigation interface, and also comprises a specific selection of a particular plurality of desirable components that jointly determine the functionality, usability, appearance, configurability, and usefulness of each said corresponding at least one particular independent content navigation interface, and that jointly define a scope of content navigation and additional interaction activities available to the user thereof;

interface implementation code that provides instructions representative of said interface configuration data to at least one of the interactive data processing application and an interface provision application, to enable at least one of the interactive data processing application and said interface provision application, to define, generate, and support operation of each said corresponding at least one particular independent content navigation interface in accordance with said interface configuration data; and interface provision code that provides instructions to the interactive data processing application to enable the interactive data processing application to obtain at least one of: said interface configuration data, and said interface implementation code.

17. The method of claim 16, wherein said step (a) comprises the step of:

(r) modifying, in accordance with said navigation interface code, at least one of: said content structure code of the content structure and said application functionality of the interactive data processing application.

18. The method of claim 17, wherein said step (r) comprises the steps of:

(s) selectively obtaining said navigation interface code configured to providing said interface implementation code representative of said interface configuration data, to the interactive data processing application;

(t) selectively inserting said navigation interface code into at least one of: said content structure code of the content structure and application code representative of said application functionality and providing;

(u) selectively obtaining said interface implementation code; and (v) selectively defining, generating, and supporting operation of each said at least one independent content navigation interface, by at least one of the interactive data processing application and said interface provision application, in accordance with said obtained interface implementation code, and in accordance with said corresponding interface configuration data.

19. The method of claim 18, wherein:

said step (s) comprises the step of: (w) obtaining said interface configuration data by at least one of: manual generation, at least partial copying from another interface configuration data, responding to an offer for provision of interface configuration data, purchasing, activating a predefined control element in a predefined independent content navigation interface, filling out an electronic form, selecting from a plurality of available interface configuration data elements, extracting from an existing interface implementation code, retrieving, in accordance with said interface provision code, from a database of interface configuration data records, and retrieving, in accordance with said interface provision code, from a predefined location;

said step (u) comprises the step of: (x) obtaining said interface implementation code by at least one of: manual generation, at least partial copying from another interface implementation code, responding to an offer for provision of interface implementation code, purchasing, activating a predefined control element in a predefined independent content navigation interface, filling out an electronic form, selecting from a plurality of available interface implementation code elements, extracting at least a portion of an existing interface implementation code, retrieving, in accordance with said interface provision code, from a database of interface implementation code records, and retrieving, in accordance with said interface provision code, from a predefined location; and said step (v) comprises the step of: (z) executing, by at least one of the interactive data processing application and said interface provision application, instructions corresponding to said obtained interface implementation code.

20. The method of claim 17, wherein each said at least one independent content navigation interface comprises a unique identifier, further comprising the step of: (aa) prior to said step (r), providing a content navigation interface database, comprising a plurality of records, each corresponding to a particular unique identifier, wherein each said plural record comprises at least one of: said interface configuration data, said navigation interface code, said interface implementation code, and said interface provision code, corresponding to said particular independent content navigation interface, associated with said unique identifier;

and wherein said step (r), further comprises the steps of:

(bb) retrieving at least a portion of a specific plural record, from said content navigation interface database by utilizing a specific corresponding unique identifier, said at least a portion of said specific plural record comprising at least a portion of at least one of a specific navigation interface code configured for obtaining a specific interface implementation code, said specific interface implementation code; a specific interface configuration data, and a specific interface provision code;

(cc) generating, from said at least a portion of said specific plural record, and utilizing, in at least one of: said content structure code of the content structure and application code representative of said application functionality, at least one of: a desired navigation interface code configured for obtaining a desired interface implementation code, said desired interface implementation code; a desired interface configuration data, and a desired interface provision code;

(dd) defining, generating, and supporting operation of a desired at least one independent content navigation interface, by at least one of the interactive data processing application and said interface provision application, in accordance with at least a portion of said desired interface configuration code;

(ee) assigning a new unique identifier to each said desired at least one independent content navigation interface, and selectively linking at least one of said new unique identifiers to said specific unique identifier, such that any changes to said particular independent content navigation interface may be at least partially propagated to said at least one desired at least one independent content navigation interface linked thereto, to establish at least one relationship therewith;

(ff) selectively tracking and recording said at least one relationship established at said step (dd); and (gg) deriving at least one desirable data item from said recorded and tracked at least one relationship.

* * * * *